United States Patent
Harada et al.

(10) Patent No.: US 11,048,404 B2
(45) Date of Patent: *Jun. 29, 2021

(54) INFORMATION PROCESSING APPARATUS, INFORMATION PROCESSING METHOD, AND PROGRAM

(71) Applicant: Sony Corporation, Tokyo (JP)

(72) Inventors: Osamu Harada, Kanagawa (JP); Takeo Doi, Tokyo (JP); Junji Itoyama, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/690,145

(22) Filed: Nov. 21, 2019

(65) Prior Publication Data

US 2020/0089380 A1 Mar. 19, 2020

Related U.S. Application Data

(63) Continuation of application No. 15/726,431, filed on Oct. 6, 2017, now Pat. No. 10,521,104, which is a (Continued)

(30) Foreign Application Priority Data

Apr. 22, 2011 (JP) .............................. JP2011-096516

(51) Int. Cl.
*G06F 3/048* (2013.01)
*G06F 3/0486* (2013.01)
(Continued)

(52) U.S. Cl.
CPC .......... *G06F 3/0486* (2013.01); *G06F 1/1616* (2013.01); *G06F 3/0483* (2013.01);
(Continued)

(58) Field of Classification Search
CPC .. G06F 3/0486; G06F 3/04817; G06F 1/1616; G06F 3/0483; G06F 3/0485
See application file for complete search history.

(56) References Cited

U.S. PATENT DOCUMENTS

| 7,564,449 B2 | 7/2009 | Layton et al. |
| 9,280,265 B2 * | 3/2016 | Mochizuki ............ G06F 3/0483 |
| | | (Continued) |

FOREIGN PATENT DOCUMENTS

| EP | 2 112 594 A2 | 10/2009 |
| JP | 7-295930 A | 11/1995 |
| | (Continued) | |

OTHER PUBLICATIONS

Office Action and Search Report issued in Chinese Application 201210111655.7 dated Nov. 21, 2019.
(Continued)

*Primary Examiner* — Rashawn N Tillery
(74) *Attorney, Agent, or Firm* — Xsensus LLP

(57) ABSTRACT

An apparatus includes an operation unit, a movement amount correction unit, and a display control unit. The operation unit is configured to acquire a drag operation on a display unit. The movement amount correction unit is configured to increase a movement amount of the drag operation. The display control unit is configured to control the display unit according to the increased movement amount.

7 Claims, 29 Drawing Sheets

Related U.S. Application Data continuation of application No. 14/005,051, filed as application No. PCT/JP2012/002342 on Apr. 4, 2012, now Pat. No. 9,811,252.

(51) Int. Cl.
  *G06F 1/16* (2006.01)
  *G06F 3/0481* (2013.01)
  *G06F 3/0485* (2013.01)
  *G06F 3/0488* (2013.01)
  *G06F 3/0483* (2013.01)

(52) U.S. Cl.
  CPC ........ *G06F 3/0485* (2013.01); *G06F 3/04817* (2013.01); *G06F 3/04883* (2013.01)

(56) References Cited

U.S. PATENT DOCUMENTS

| | | |
|---|---|---|
| 2004/0095314 A1 | 5/2004 | Nakagawa |
| 2007/0030359 A1 | 2/2007 | Ito |
| 2008/0071535 A1 | 3/2008 | Yoshioka |
| 2008/0218533 A1 | 9/2008 | Goto et al. |
| 2009/0007007 A1 | 1/2009 | Voros et al. |
| 2009/0271723 A1 | 10/2009 | Matsushima ......... G06F 3/0482 715/769 |
| 2010/0001961 A1 | 1/2010 | Dieterle |
| 2010/0105440 A1 | 4/2010 | Kruzeniski |
| 2010/0162181 A1 | 6/2010 | Shiplacoff et al. |
| 2010/0205559 A1 | 8/2010 | Rose .................. G06F 3/04817 715/781 |
| 2010/0235794 A1 | 9/2010 | Ording |
| 2010/0321411 A1 | 12/2010 | Paek et al. |
| 2011/0060988 A1 | 3/2011 | Mysliwy |
| 2011/0242361 A1 | 10/2011 | Kuwahara ............... A63F 13/10 348/231.4 |
| 2012/0017177 A1 | 1/2012 | Kim et al. |
| 2012/0088548 A1 | 4/2012 | Yun |
| 2012/0182324 A1 | 7/2012 | Yano |
| 2012/0192095 A1 | 7/2012 | Bamford et al. |
| 2013/0219341 A1 | 8/2013 | Lee ..................... G06F 3/0482 715/835 |
| 2013/0254692 A1 | 9/2013 | Han ..................... G06F 3/0486 715/769 |
| 2013/0285964 A1 | 10/2013 | Kang |

FOREIGN PATENT DOCUMENTS

| | | |
|---|---|---|
| JP | 2008-217555 A | 9/2008 |
| JP | 2010-182017 A | 8/2010 |
| JP | 2011-59820 A | 3/2011 |
| TW | 489275 | 6/2002 |
| TW | 200945168 A | 11/2009 |

OTHER PUBLICATIONS

Pogue, D., "iPhone: The Missing Manual", 4th Edition, 29 Pages total, (Aug. 24, 2010).
International Search Report dated Jul. 17, 2012 in PCT/JP2012/002342.
Extended European Search Report dated Oct. 28, 2014 in the corresponding European Application No. 12774260.9.
David Pogue, "iPhone: The Missing Manual", Fourth Edition, XP055042248, Aug. 24, 2010, 57 pages.
Office Action dated Mar. 10, 2015 in Japanese Patent Application No. 2011-096516 (with English language translation).
Checking and Setting prior to Use, Optimus chat L-04C Instruction Manual, NTT DOCOMO INC, Internet URL:http://www.nttdocomo/os.jp / support / trouble / manual / download / 104c / index.html> LG Electronics Inc, Internet <URL:http://www.nttdocomo.co.jp / support / trouble /manual / download / 104c / index, (Feb. 26, 2011), pp. 36-37.
Chinese Office Action dated Mar. 3, 2016 in Chinese Application No. 201210111855.7 (with English Translation).
Summons to attend oral proceedings pursuant to Rule 115(1) EPC dated Mar. 8, 2018 in Patent Application No. 12774260.9.
MrMultiCodes, "Xcode: Galeria de Imácon UIScrollView y UIPageControl", YouTube, Mar. 26, 2011, XP054978081, https://www.youtube.com/watch?v=j_CageT0dOc.

* cited by examiner

INFORMATION PROCESSING APPARATUS, INFORMATION PROCESSING METHOD, AND PROGRAM

CROSS-REFERENCE TO RELATED APPLICATIONS

The present application is a continuation of U.S. application Ser. No. 15/726,431, filed on Oct. 6, 2017, which is a continuation of U.S. application Ser. No. 14/005,051, filed on Sep. 13, 2013 (now U.S. Pat. No. 9,811,252), which is the National Stage of International Application No. PCT/JP2012/002342, filed on Apr. 4, 2012, which claimed priority to Japanese Application JP 2011-096516, filed on Apr. 22, 2011, the entire contents of all of which are hereby incorporated by reference.

TECHNICAL FIELD

The present disclosure relates to an information processing apparatus, an information processing method, and a program encoded on a non-transitory computer readable medium.

BACKGROUND ART

In recent years, information processing apparatuses such as a tablet personal computer (PC) and a smart phone have come into wide use. To improve operability of such an information processing apparatus, for example, technology related to a graphical user interface (GUI) displayed on a display is being developed. As the technology related to the GUI, technology for providing a GUI suitable for characteristics of a touch pad used as an operation unit, and the like are well known, for example, as disclosed in Patent Literature 1.

CITATION LIST

Patent Literature

[PTL 1]
JP 2011-059820A

SUMMARY

Technical Problem

However, the improvement of the operability of the information processing apparatus is not enough even in the technology disclosed in Patent Literature 1 or the like. According to the wide use of tablet PCs, smart phones, and the like, users have a variety of needs for the information processing apparatuses, and there is a demand to further improve the operability in a GUI of the information processing apparatus.

Solution to Problem

Accordingly, the present invention broadly comprises an apparatus, a method, and a non-transitory computer readable medium encoded with a program which causes the processor to perform the method. In one embodiment, the apparatus includes an operation unit, a movement amount correction unit, and a display control unit. The operation unit is configured to acquire a drag operation on a display unit. The movement amount correction unit is configured to increase a movement amount of the drag operation. The display control unit is configured to control the display unit according to the increased movement amount.

DESCRIPTION OF EMBODIMENTS

Figure 1:
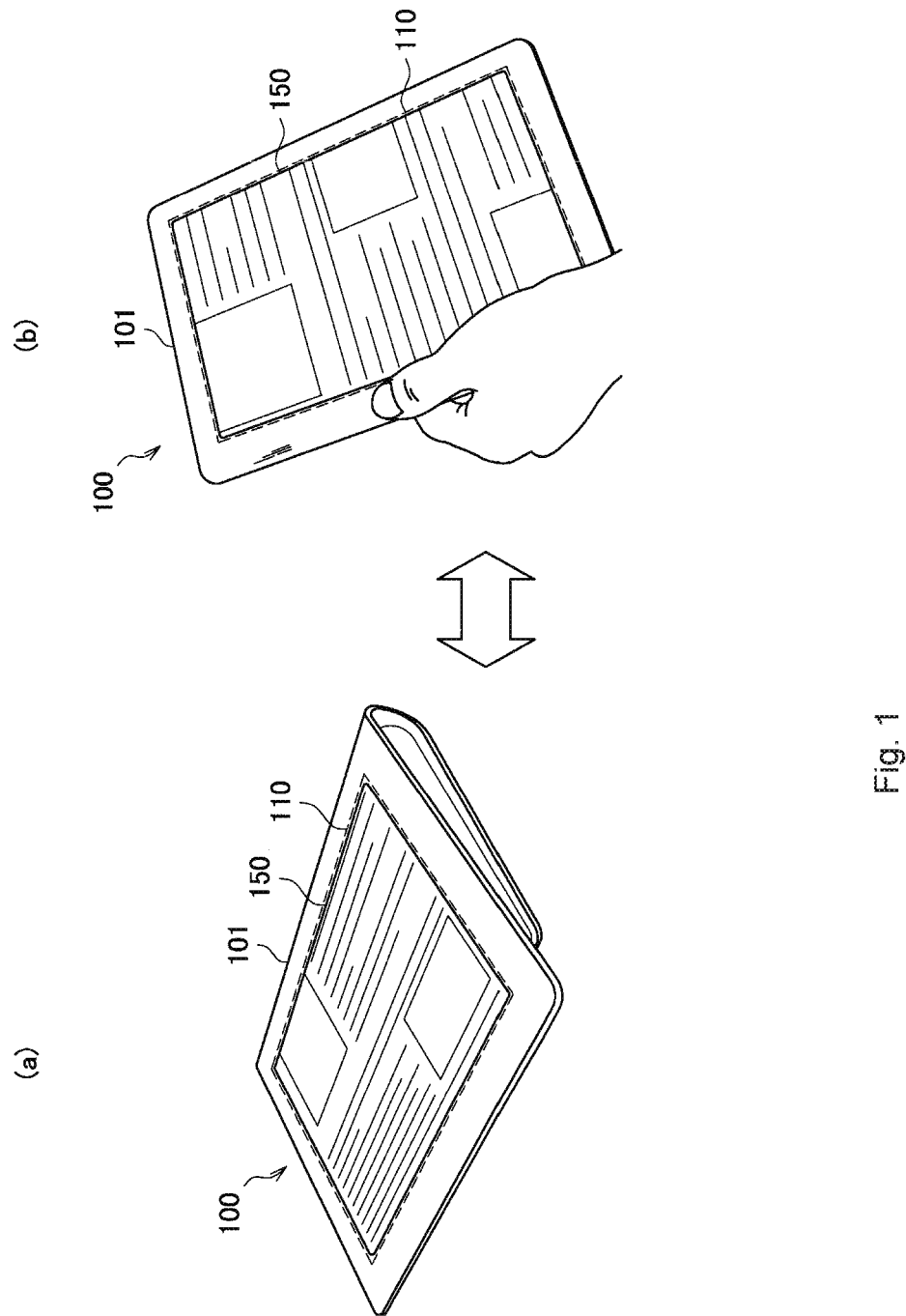
FIG. 1 is a diagram showing an external appearance of a first information processing apparatus according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Description will be given in the following order.
1. Examples of Information Processing Apparatus
   1-1. First Information Processing Apparatus
   1-2. Second Information Processing Apparatus
2. Embodiments According to Information Processing Apparatus
   2-1. First Embodiment
   2-2. Second Embodiment
   2-3. Third Embodiment
   2-4. Fourth Embodiment
   2-5. Fifth Embodiment
   2-6. Sixth Embodiment
3. Supplement Technology according to the present disclosure may be performed, for example, in the information processing apparatus. In the following description, first, two examples of the information processing apparatus in which the technology according to the present disclosure is performed will be described. Then, six embodiments applicable to these information processing apparatuses will be described. All the embodiments are implemented to improve the operability of a GUI of the information processing apparatus. Any one embodiment may be independently applied to the information processing apparatus and a combination of two or more embodiments may be applied.

(1. Examples of Information Processing Apparatus According to Embodiment)

(1-1. Example of First Information Processing Apparatus)

Figure 2:
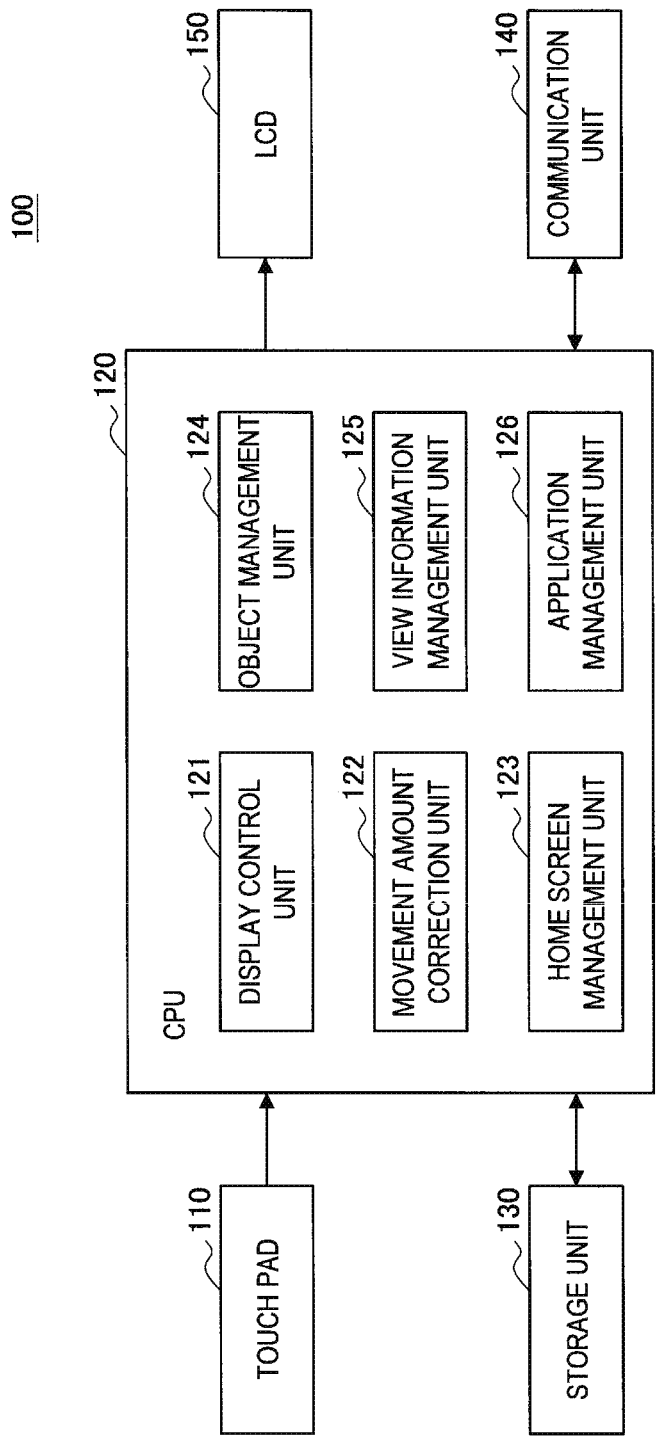
FIG. 2 is a block diagram showing a functional configuration of the first information processing apparatus.

First, an information processing apparatus 100, which is a first example of the information processing apparatus according to an embodiment of the present disclosure, will be described with reference to FIGS. 1 and 2. FIG. 1 is a diagram showing an external appearance of the information processing apparatus 100. FIG. 2 is a block diagram showing a functional configuration of the information processing apparatus 100.

Referring to FIG. 1, the information processing apparatus 100 has a housing 101, a liquid crystal display (LCD) 150, and a touch pad 110 provided on the LCD 150. The information processing apparatus 100 may correspond to both an arrangement in which the LCD 150 is horizontally long, for example, as shown in (a), and an arrangement in which the LCD 150 is vertically long, for example, as shown in (b). The information processing apparatus 100 may be a tablet PC, a smart phone, or the like that is held when used, for example, as shown in (b).

This information processing apparatus 100 acquires an operation of a user using the touch pad 110. For example, on the LCD 150, an operation icon such as a button or a bar is displayed as a GUI. The user touches with the touch pad 110 of a position of an icon corresponding to a desired operation using a finger or a pen. In this case, the touch pad 110 may acquire an operation in which the user selects an icon. This operation may be used, for example, when an application indicated by an icon displayed on the GUI is started up, or the like.

In addition, for example, the user may touch with an arbitrary position on the LCD 150, move a finger, a pen, or the like while maintaining the touch, and release the touch in another position on the LCD 150. In this case, the touch pad 110 can acquire a direction of movement of a touch position, and an amount of movement, and the like as an operation of the user in addition to the touch position. This operation is used, for example, when a display of the GUI is scrolled in a specific direction, or the like.

Referring to FIG. 2, the information processing apparatus 100 has the touch pad 110, a central processing unit (CPU) 120, a storage unit 130, a communication unit 140, and the LCD 150.

The touch pad 110 is an example of an operation unit. The touch pad 110 provided on the LCD 150 detects touch of the user, and acquires a touch position, a direction in which the touch position has moved, an amount of movement, and the like as an operation of the user. The touch pad 110 provides information of the acquired operation of the user to the CPU 120. Although the touch pad 110 is used as the operation unit in the information processing apparatus 100, the example of the operation unit is not limited thereto. For example, the operation unit may be another pointing device such as a mouse or a pen tablet, and may be another input device such as a keyboard.

The CPU 120 operates according to a program stored in the storage unit 130, and controls an operation of each part of the information processing apparatus 100. The CPU 120 acquires information of an operation of the user from the touch pad 110, which is the operation unit. The CPU 120 controls a display in the LCD 150, which is a display unit. The CPU 120 temporarily or permanently stores information to be used for processing in the storage unit 130. The CPU 120 may further communicate with a network via the communication unit 140.

Here, the CPU 120 implements, for example, functions of a display control unit 121, a movement amount correction unit 122, a home screen management unit 123, an object management unit 124, a view information management unit 125, and an application management unit 126. Hereinafter, the functions of these parts will be described. In addition to these parts, the CPU may implement various functions necessary to control the operation of the information processing apparatus 100.

The display control unit 121 controls a display in the LCD 150, which is the display unit. For example, the display control unit 121 causes the LCD 150 to display the GUI and vary the display of the GUI according to the user's operation acquired by the touch pad 110.

The movement amount correction unit 122, the home screen management unit 123, the object management unit 124, the view information management unit 125, and the application management unit 126 are mainly used in the embodiments to be described later. Accordingly, when each embodiment is not applied to the information processing apparatus 100, the CPU 120 does not necessarily implement the functions of the above-described parts. Details of the functions of the parts will be described in detail in the description of each embodiment.

Various information regarding processing of the information processing apparatus 100 is temporarily or permanently stored in the storage unit 130. An example of the storage unit 130 may be a semiconductor memory such as a flash read only memory (ROM) or a dynamic random access memory (DRAM), an optical disc such as a blu-ray disc (BD), a digital versatile disc (DVD), or a compact disc (CD), a hard disk drive (HDD), or the like. The storage unit 130 may be a storage apparatus embedded in the information processing apparatus 100, and removable media such as a memory card attachable to or detachable from the information processing apparatus 100. In addition, the storage unit 130 may include a plurality of types of storage apparatuses or removable media.

Here, a program to be executed by the CPU 120 is stored in the storage unit 130. The program may be pre-stored in the storage unit 130. As this program, a program provided by being stored in the above-described removable media or a program downloaded from a network via the communication unit 140 may be temporarily stored in the storage unit 130. Further, information exchanged by the CPU 120 with the touch pad 110, the LCD 150, and the communication unit 140, information generated by the CPU 120 in the course of processing, and the like may be temporarily stored in the storage unit 130.

The communication unit 140 is a communication interface including a communication device for connecting to a network. An example of the communication unit 140 is a port or communication card for a universal serial bus (USB), Institute of Electrical and Electronics Engineers (IEEE) 1394, a small computer system interface (SCSI), a high-definition multimedia interface (HDMI), a local area network (LAN), Bluetooth (registered trademark), a wireless USB (WUSB), or the like. The communication unit 140 may be connected to the Internet, a home LAN, or a network for infrared communication, radio wave communication, satellite communication, or the like, and may exchange various data regarding processing of the information processing apparatus 100. The communication unit 140 may be used to download a program to be executed by the CPU 120 from the network.

The LCD 150 is an example of the display unit. The LCD 150 is controlled by the CPU 120, and displays various images including a GUI. Although the LCD 150 is used as the display unit in the information processing apparatus 100, the example of the display unit is not limited thereto. For example, the display unit may be another display apparatus such as an organic electro-luminescence (EL) panel, and may be configured separately from the information processing apparatus.

(1-2. Example of Second Information Processing Apparatus)

Figure 3:
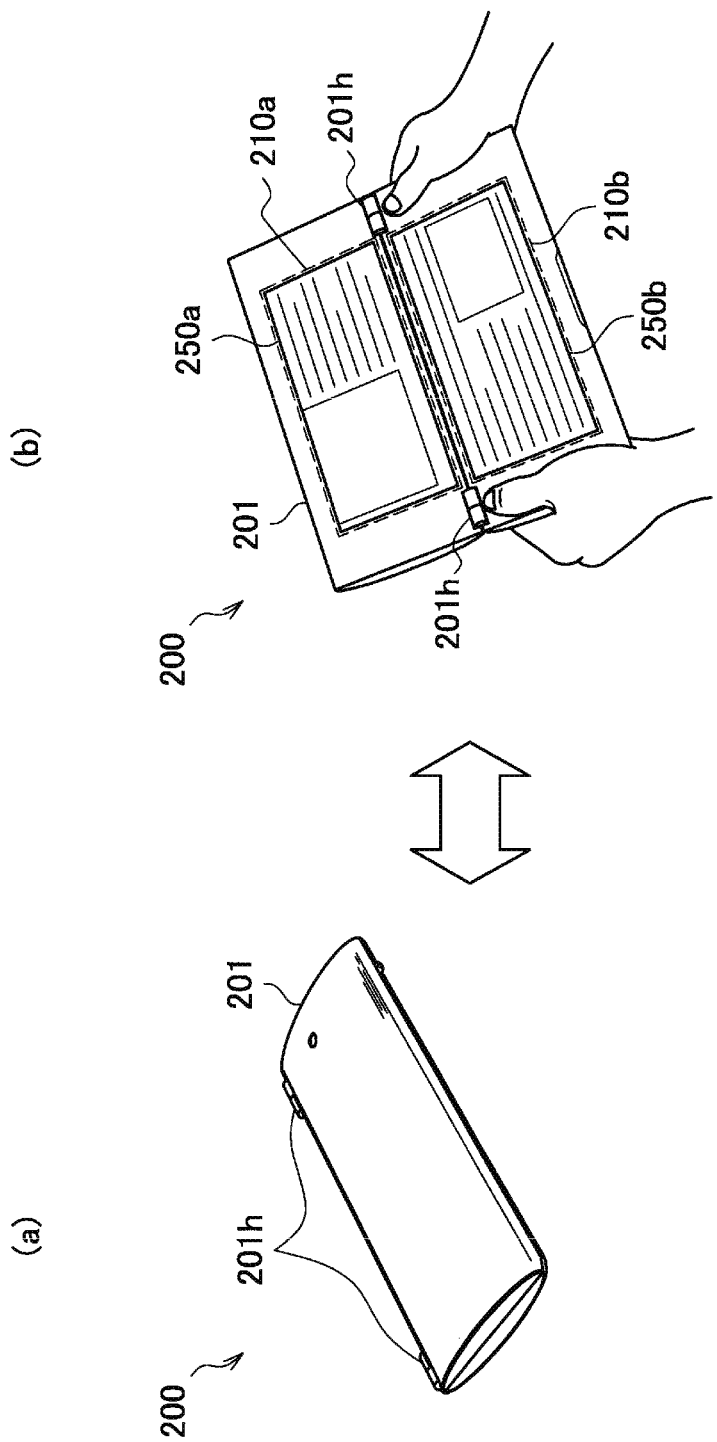
FIG. 3 is a diagram showing an external appearance of a second information processing apparatus according to an embodiment of the present disclosure.
Figure 4:
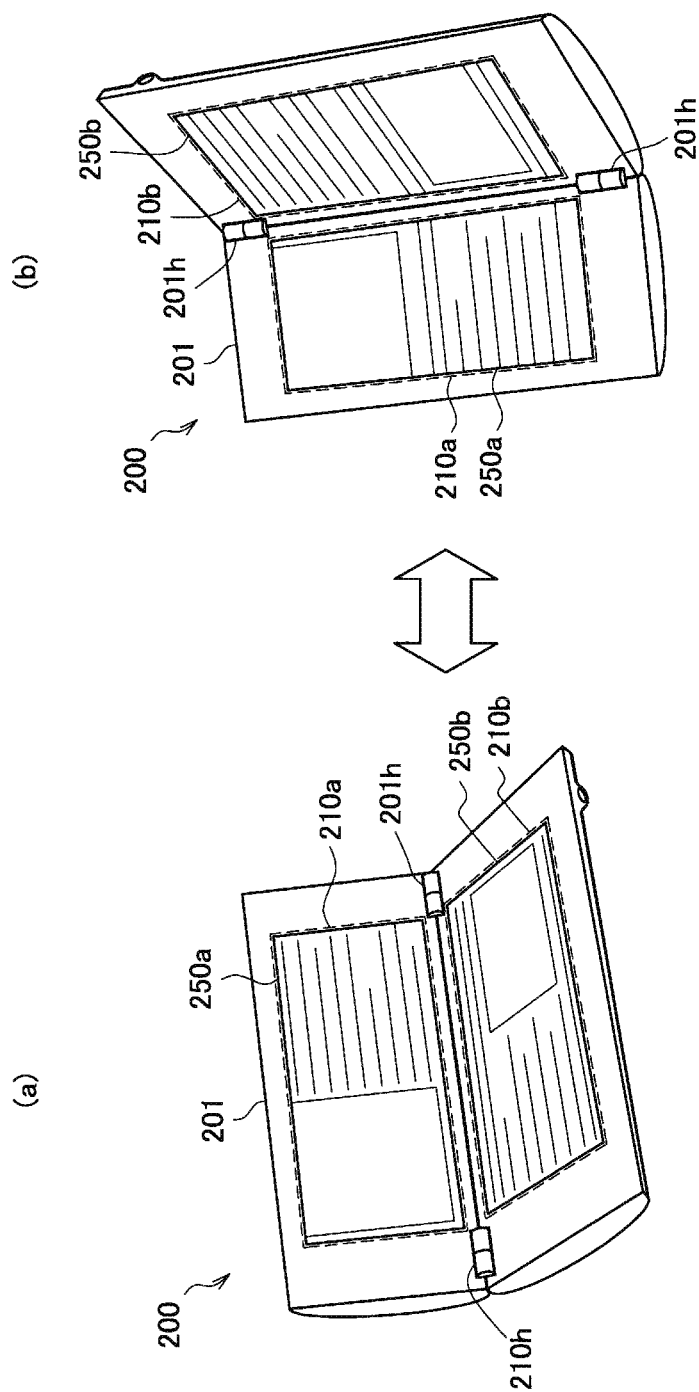
FIG. 4 is a diagram showing the external appearance of the second information processing apparatus.
Figure 5:
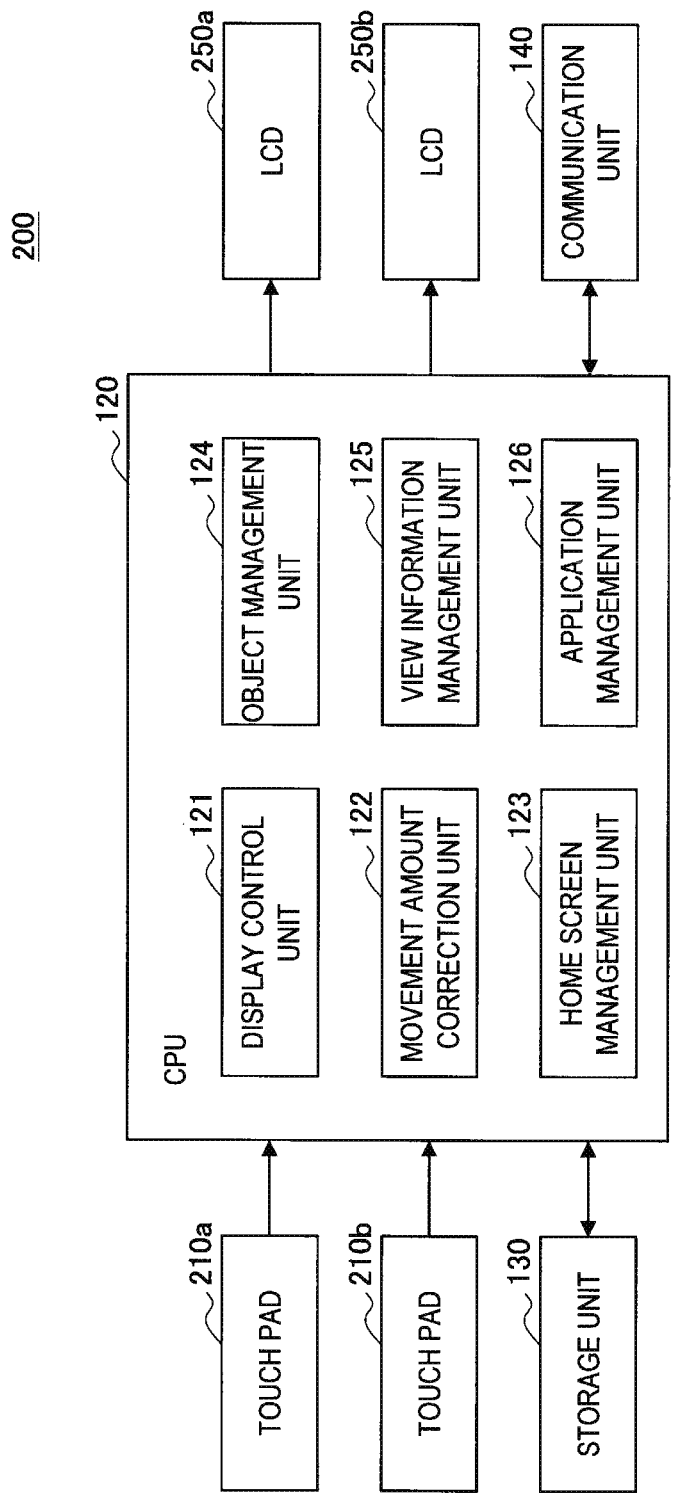
FIG. 5 is a block diagram showing a functional configuration of the second information processing apparatus.

Next, an information processing apparatus 200, which is the second example of the information processing apparatus according to an embodiment of the present disclosure, will be described with reference to FIGS. 3 to 5. FIGS. 3 and 4 are diagrams showing an external appearance of the information processing apparatus 200. FIG. 5 is a block diagram showing a functional configuration of the information processing apparatus 200.

Referring to FIG. 3, the information processing apparatus 200 has a housing 201, LCDs 250a and 250b, and touch pads 210a and 210b each provided on the LCDs 250a and 250b. The housing 201 has a hinge 201h, and can be folded so that the LCDs 250a and 250b are on the inner side using the hinge 201h as a pivot point. (a) shows a state in which the housing 201 has been folded, and (b) shows a state in which the housing 201 has been opened. The housing 201 can be folded, for example, so that portability of the information processing apparatus 200 can be improved. The information processing apparatus 200 may be a tablet PC, a smart phone, or the like that is held when used, for example, as shown in (b).

Referring to FIG. 4, for example, the information processing apparatus 200 may correspond to both an arrangement in which the LCD 210a and the LCD 210b are connected in a vertical direction as shown in (a), and an arrangement in which the LCD 210a and the LCD 210b are connected in a horizontal direction as shown in (b). In addition, the information processing apparatus 200 may be used in a state in which the housing 201 is half opened as shown in (a) and (b).

This information processing apparatus 200 may acquire an operation of the user using GUIs displayed on the LCDs 250a and 250b and the touch pads 210a and 210b. Functions of the LCD 250 and the touch pad 210 are substantially the same as those of the LCD 150 and the touch pad 110 described above. However, because the LCD 250 and the touch pad 210 are physically separated into two parts, their functions may be different from those of the LCD 150 and the touch pad 110. This case will be described later.

Referring to FIG. 5, the information processing apparatus 200 has the touch pads 210a and 210b, the CPU 120, the storage unit 130, the communication unit 140, and the LCDs 250a and 250b.

The touch pads 210a and 210b are examples of the operation unit. The touch pads 210a and 210b each provided on the LCDs 250a and 250b detect touch of the user, and acquire a touch position, a direction in which the touch position has moved, or a movement amount as an operation of the user. The touch pads 210a and 210b each provide information of the acquired operation of the user to the CPU 120.

The LCDs 250a and 250b are examples of the display unit. The LCDs 250a and 250b are each controlled by the CPU 120, and display various images including a GUI. The LCDs 250a and 250b may be integrally used to display a series of images, and each may independently display a separate image. In addition, according to display content of the LCDs 250a and 250b, switching may be performed when either the touch pad 210a or 210b is operable and when both are operable. For example, when the GUI is displayed on the LCD 250a, the touch pad 210a may be set to be operable.

(2. Embodiment According to Information Processing Apparatus)

(2-1. First Embodiment)

Figure 6:
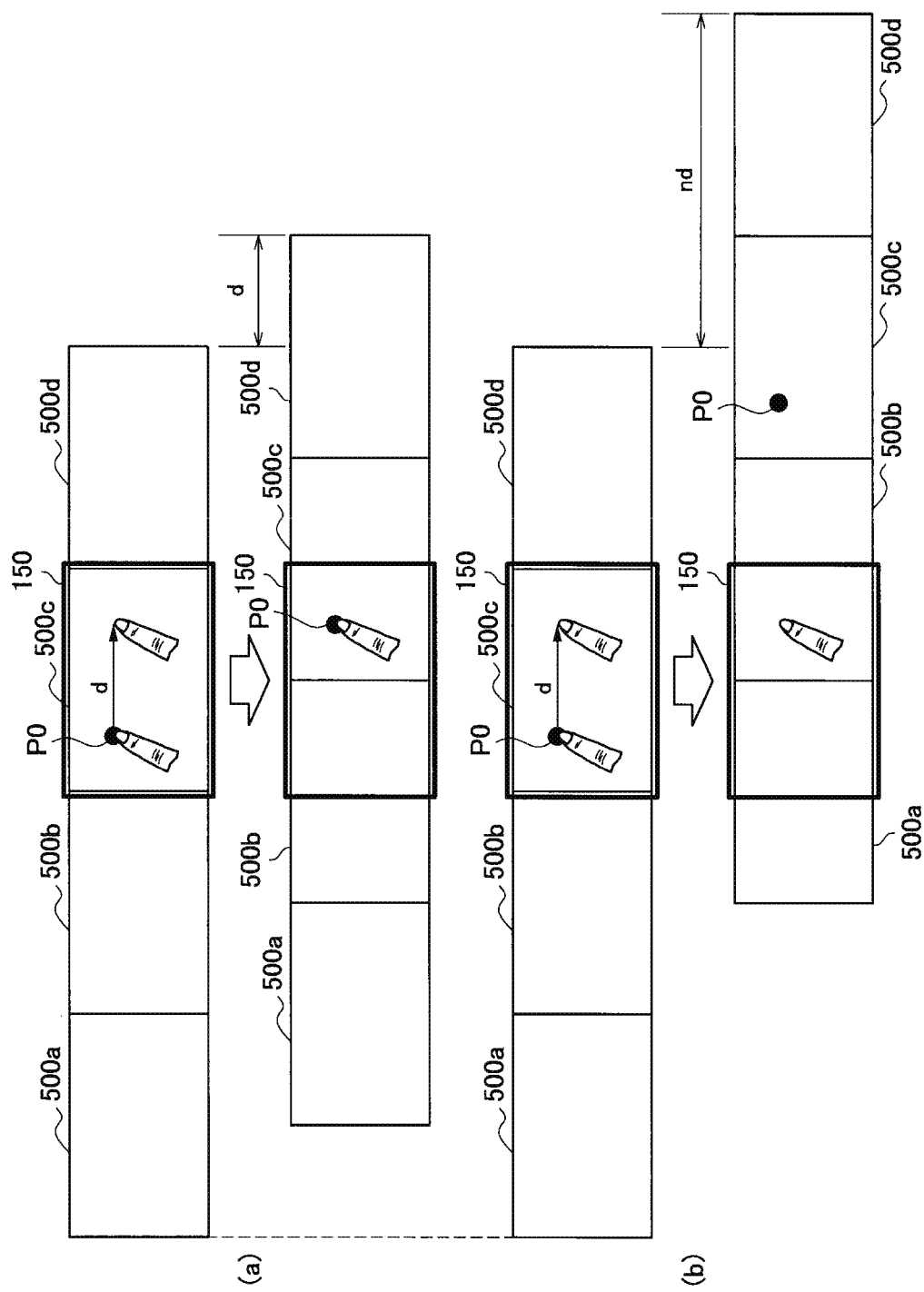
FIG. 6 is a diagram illustrating an overview of a first embodiment of the present disclosure.
Figure 7:
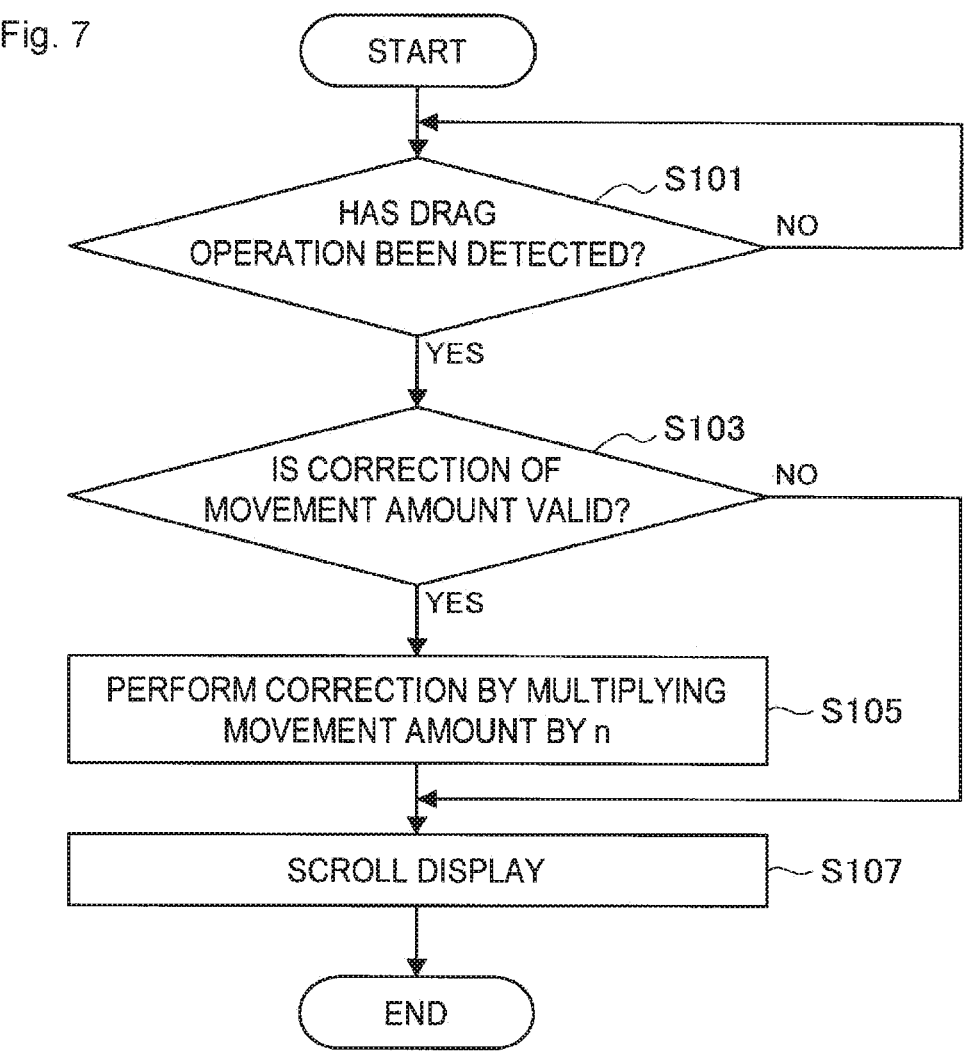
FIG. 7 is a flowchart showing a process of the first embodiment of the present disclosure.
Figure 8:
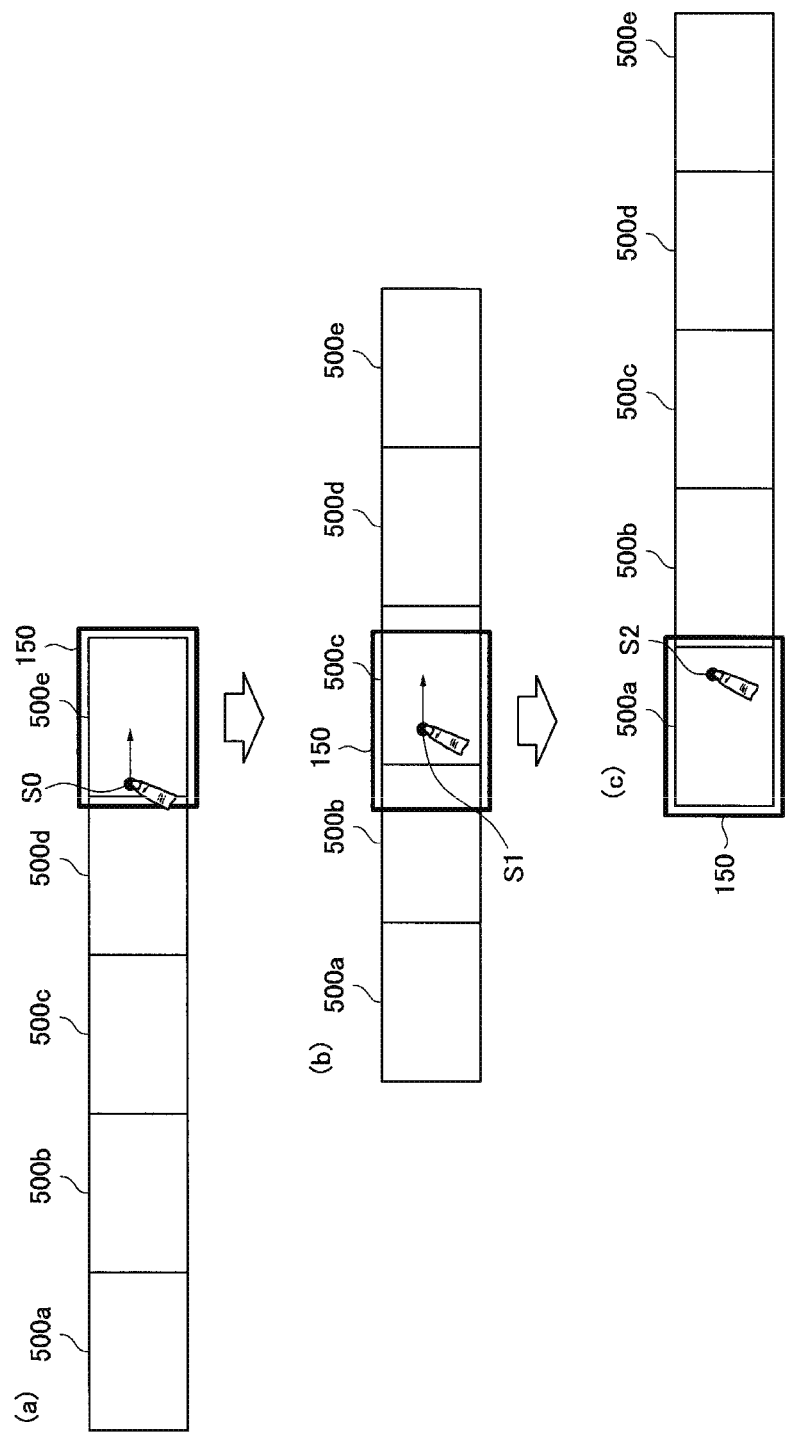
FIG. 8 is a diagram illustrating an application example of the first embodiment of the present disclosure.
Figure 9:
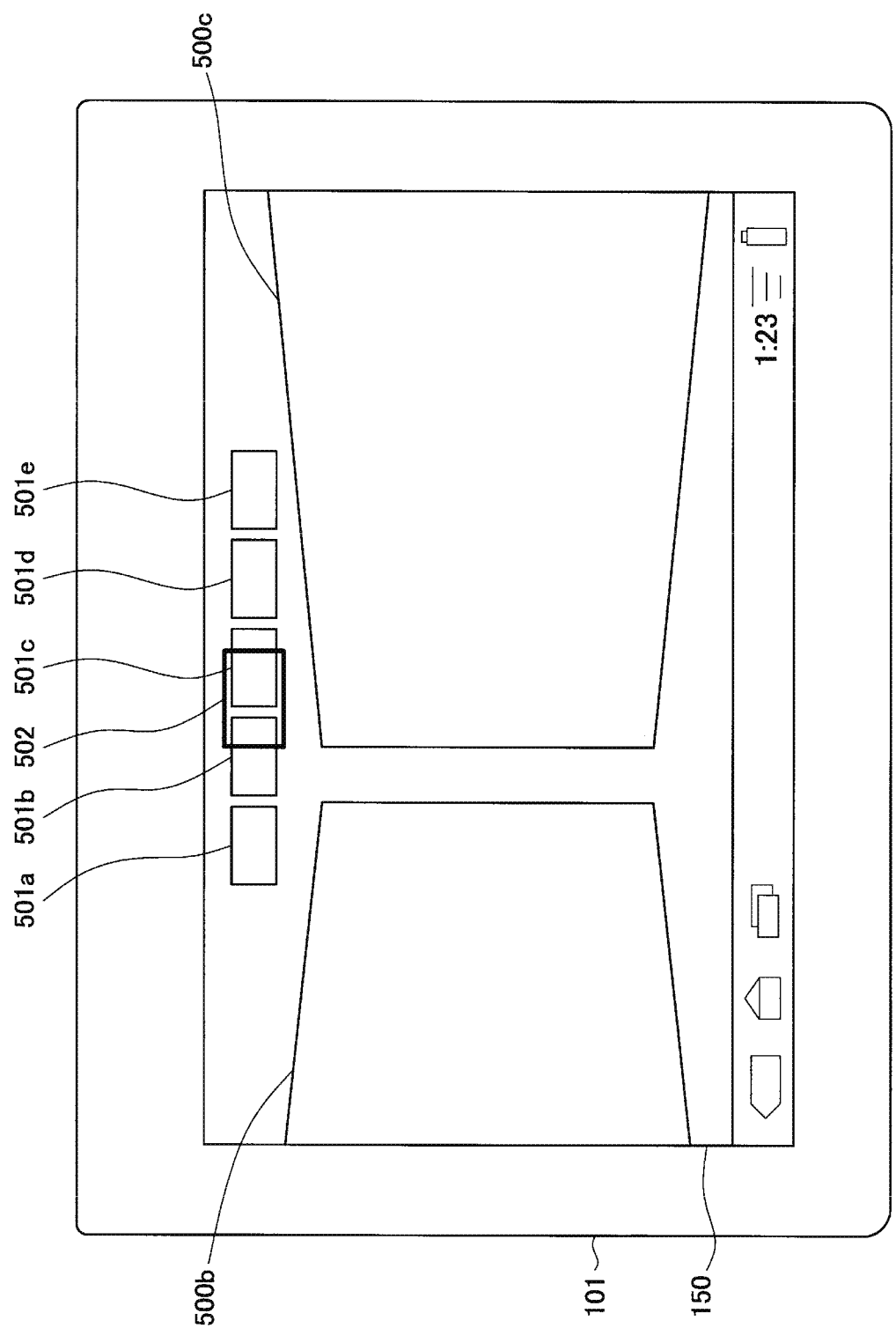
FIG. 9 is a diagram showing a display example of the first information processing apparatus to which the first embodiment of the present disclosure has been applied.
Figure 10:
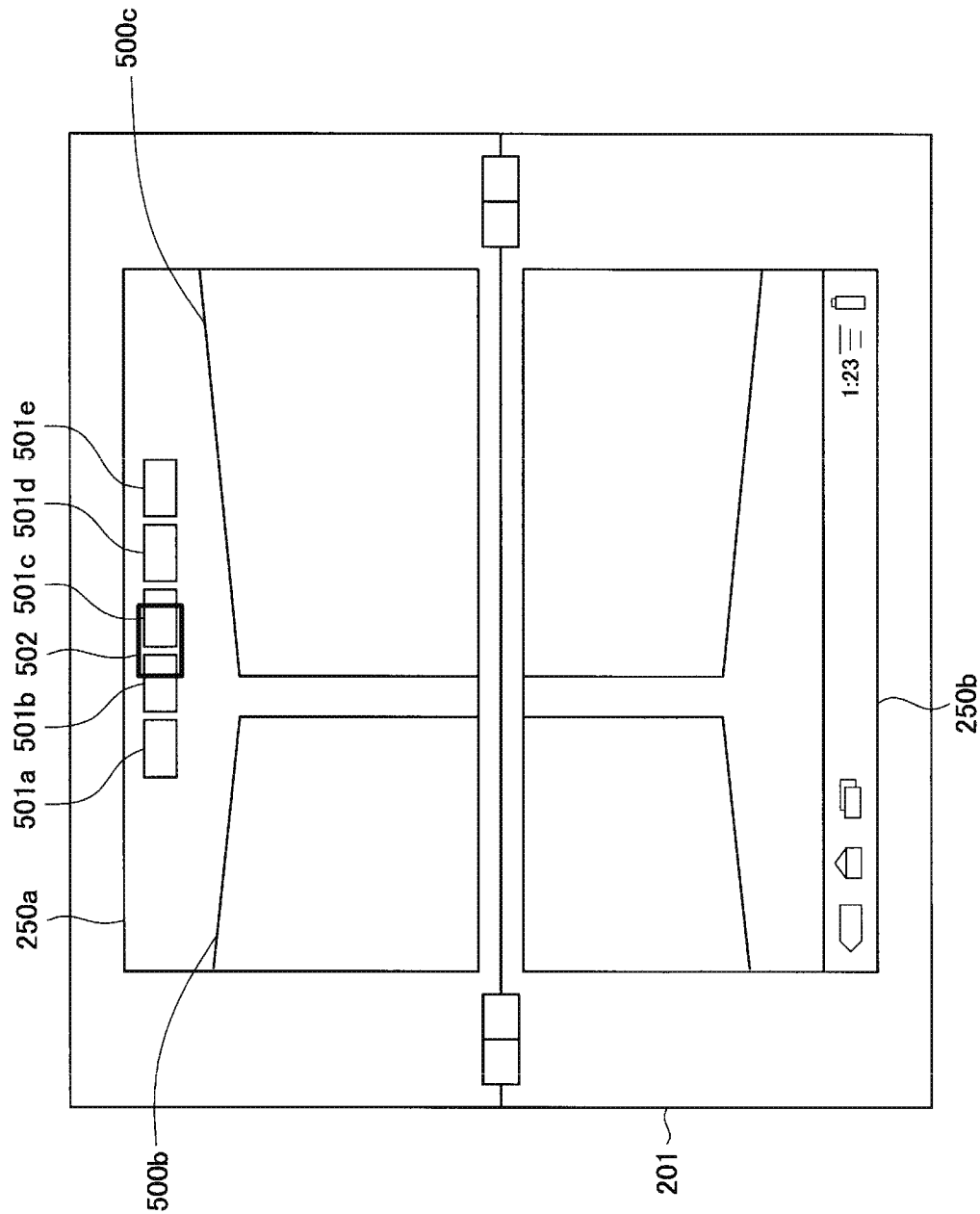
FIG. 10 is a diagram showing a display example of the second information processing apparatus to which the first embodiment of the present disclosure has been applied.

Next, the first embodiment of the present disclosure will be described with reference to FIGS. 6 to 10. FIG. 6 is a diagram illustrating an overview of this embodiment. FIG. 7 is a flowchart showing a process of this embodiment. FIG. 8 is a diagram illustrating an application example of this embodiment. FIG. 9 is a diagram showing a display example of the information processing apparatus 100 to which this embodiment has been applied. FIG. 10 is a diagram showing a display example of the information processing apparatus 200 to which this embodiment has been applied.

In the information processing apparatus, an amount of information capable of being displayed on the display unit is limited. Technology for providing the user with more information by scrolling part or all of a display of content in the display unit is well known. For example, there are two types in an operation of scrolling a display. One is an operation on an operating element such as a scroll bar displayed as a GUI in a specific position on the display unit, and the other is a drag operation at an arbitrary position on the display unit. When the display is scrolled by the drag operation, a movement amount of the drag operation is identical with a display scroll amount. Thereby, for example, when the user browses an image, a document, or the like, the display can be scrolled as if it was paper sliding on a desk, and a more intuitive operation is implemented.

Incidentally, in recent years, technology for providing a plurality of work screens called home screens on which an icon for starting up an application or the like is arranged and switching a home screen to be displayed according to a user's desire in an information processing apparatus such as a tablet PC or a smart phone has been developed. For example, this technology considers providing a GUI for switching a display to another home screen adjacently arranged by scrolling the display of the home screen in the drag operation.

As described above, scrolling by the drag operation is preferred in that the scrolling is implemented by an intuitive operation of the user. However, it is necessary to scroll a display of at least one home screen in order to switch the home screen. When a large scroll operation is intended by the drag operation as described above, the drag operation is iterated a number of times until a desired scroll amount is reached. Thereby, operability is likely to be degraded.

In this embodiment, there is provided novel technology for facilitating a large scroll operation by a drag operation.

In the above-described information processing apparatus 100, the operation unit is implemented by the touch pad 110, the movement amount correction unit and the display control unit are implemented by the CPU 120 as the movement amount correction unit 122 and the display control unit 121, and the display unit is implemented by the LCD 150. Among these, the movement amount correction unit 122 may provide the display control unit 121 with the enlarged movement amount by enlarging the movement amount of the drag operation of the user acquired by the touch pad 110. The display control unit 121 scrolls the display of the LCD 150 according to the provided movement amount.

For example, the movement amount correction unit 122 enlarges the movement amount of the drag operation by multiplying the movement amount by a predetermined value n (n>1). In this case, a scroll amount for a movement amount d of the drag operation becomes nd. Alternatively, the movement amount correction unit 122 may correct the movement amount by adding a predetermined value m (m>0) to the movement amount. In this case, a scroll amount for the movement amount d of the drag operation becomes m+d.

In addition, the movement amount correction unit 122 may switch whether or not to correct the movement amount according to the user's operation or the like. This switching may be executed by an operation, for example, such as a double-tap on the touch pad 110. In addition, whether or not to correct the movement amount may be determined on the basis of a type of drag operation so that the correction of the movement amount is applicable to a drag operation by multi-touch on the touch pad 110 and the correction of the movement amount is inapplicable to a drag operation by a single touch. Thereby, an operation in which the user switches the presence/absence of a correction of the movement amount is facilitated.

The movement amount correction unit 122 may further switch a value to be used in the correction of the movement amount. This switching may be executed, for example, by the display control unit 121 causing the LCD 150 to display a GUI of a setting screen. For example, when the movement amount correction unit 122 corrects the movement amount by multiplication of a predetermined value n, the predetermined value n may be selected from among options of 2, 3, 4, . . . , or a setting screen to which the predetermined value n can be directly input may be provided. Thereby, it is possible to set a correction amount according to an operation feeling unique to the user.

In FIG. 6, a case of (a) in which the movement amount d of the drag operation is consistent with the scroll amount d of the display and a case of (b) in which the scroll amount of the display enlarged by multiplying the movement amount d of the drag operation by n becomes nd in the information processing apparatus 100 are shown. In the case of either (a) or (b), four home screens 500a to 500d are also set in the information processing apparatus 100. The home screens 500a to 500d are virtually arranged in a left-right direction, and the display control unit 121 scrolls the display of the LCD 150 in the left-right direction, so that the home screens 500a to 500d are sequentially displayed. In the shown example, the home screen 500c is displayed on the LCD 150 in an initial state. In the case of either (a) or (b), the user also makes touch with the touch pad 110 of a position corresponding to a position P0 on the LCD 150 with a finger, and executes the drag operation of moving the finger in the right direction by the movement amount d while maintaining the touch.

In the case of (a), the scroll amount of the display is consistent with the movement amount d of the drag operation. Accordingly, a position on the screen where the finger of the user is touching after the drag operation is the same position P0 on the screen as before the drag operation. After the home screen 500 has virtually moved by the scroll amount d to the right by scrolling, the home screen 500c and the home screen 500b are displayed on the LCD 150. This is an intermediate state in which the home screen 500c is switched to the adjacently arranged home screen 500b by scrolling. Thereafter, it is difficult to fully display the home screen 500b on the LCD 150 even when the drag operation is further continued to the right. To display the home screen 500b or the home screen 500a, the user needs to re-execute the drag operation by returning the finger to the left side of the LCD 150.

On the other hand, in the case of (b), the scroll amount of the display becomes a value after the correction has been performed by multiplying the movement amount d of the drag operation by n. Accordingly, the scroll amount is larger than the movement amount of the drag operation, and the position on the screen where the finger of the user is touching after the drag operation becomes a position different from the position P0 on the screen before the drag operation. After the home screen 500 has virtually moved by the scroll amount nd to the right by scrolling, the home screen 500b and the home screen 500a are displayed on the LCD 150. This is an intermediate state in which the home screen 500c is switched to the adjacently arranged home screen 500b and the home screen 500b is further switched to the adjacently arranged home screen 500a. Thereafter, it is preferable that the user perform the drag operation to return to the left when desiring to display the home screen 500b. In addition, it is preferable that the user continue the drag operation to the right when desiring to display the home screen 500a.

According to the information processing apparatus 100 related to this embodiment, it is possible to execute a scroll operation such as switching of a home screen in which a large scroll amount is necessary without iterating the drag operation a number of times. In addition, if the movement amount correction unit 122 can switch whether or not to enlarge the movement amount, it is possible to execute a normal scroll operation as shown in (a), when necessary.

In FIG. 7, the example of the process according to this embodiment is shown in the flowchart. In the shown example, the movement amount of the drag operation is enlarged by multiplication of a predetermined value n. Although an example of the information processing apparatus 100 will be described in the following description, the case of the information processing apparatus 200 is also similar.

First, the touch pad 110 detects a drag operation at an arbitrary position of the LCD 150 (step S101). If the drag operation has been detected, a movement amount of the drag operation is provided to the movement amount correction unit 122, and the movement amount correction unit 122 determines whether or not a correction of the movement amount is applicable (step S103).

Here, if the correction of the movement amount is set to be applicable, the movement amount correction unit 122 performs the correction by multiplying the movement amount by n (step S105). The corrected movement amount is provided from the movement amount correction unit 122 to the display control unit 121. On the other hand, if the correction of the movement amount is not set to be applicable, the movement amount correction unit 122 provides the movement amount to the display control unit 121 with no correction.

Next, the display control unit 121 scrolls the display of the LCD 150 by the movement amount provided from the movement amount correction unit 122 (step S107). If the correction of the movement amount by the movement amount correction unit 122 is set to be applicable, the display of the LCD 150 is scrolled, for example, as shown in (b) of FIG. 6. In addition, if the correction of the movement amount by the movement amount correction unit 122 is not set to be applicable, the display of the LCD 150 is scrolled, for example, as shown in (a) of FIG. 6.

In FIG. 8, an example in which five home screens 500a to 500e are all scrolled and displayed on the LCD 150 by a drag operation from one end to the other of the LCD 150 using this embodiment is shown. The home screens 500a to 500e are virtually arranged in the left-right direction, and the display control unit 121 scrolls the display of the LCD 150 in the left-right direction, so that the home screens 500a to 500e are sequentially displayed on the LCD 150. In the shown example, the user touches the touch pad 110 in a position S0 of a left end of the LCD 150 with the finger as shown in (a), and executes the drag operation of moving the finger to a position S2 of a right end of the LCD 150 with the finger as shown in (c) through a state in which the finger is touching with a position S1 around the center of the LCD as shown in (b).

At a start time of the drag operation shown in (a), the home screen 500e arranged on the farthest right among the home screens 500 is displayed on the LCD 150. At an intermediate time of the drag operation shown in (b), the home screens 500 virtually move to the right by scrolling and the home screen 500c arranged at the center among the home screens 500 and the home screen 500b adjacent thereto are displayed on the LCD 150. At an end time of the drag operation shown in (c), the home screens 500 further virtually move to the right by scrolling and the home screen 500a arranged on the farthest left among the home screens 500 is displayed on the LCD 150.

As described above, in the shown example, the user can scroll and display all five of the home screens 500a to 500e on the LCD 150 by the drag operation from a left end to a right end of the LCD 150, that is, the drag operation for one screen of the home screens 500. The scrolling as described above is possible, for example, when the movement amount correction unit 122 corrects the movement amount of the drag operation by multiplication of a predetermined value n, and the predetermined value n is set to the number of home screens, that is, 5, in the shown example. In this case, the predetermined value n may be a value obtained by adding a correction value c (0<c<1) to the number of home screens in consideration of variation of a position when the user is touching an end of the LCD 150. In addition, the movement amount correction unit 122 may automatically set the predetermined value n according to the set number of home screens 500.

In FIG. 9, a display example of the LCD 150 while the home screen 500 is switched by scrolling in the information processing apparatus 100 to which this embodiment has been applied is shown. In the shown example, the home screen 500b and the home screen 500c are switched according to a motion such as a swing. As described above, the switching of the home screen 500 by scrolling may be displayed according to various display effects. On the LCD 150, icons 501a to 501e indicating all the home screens 500a to 500e and an icon 502 indicating an area displayed on the LCD 150 among the home screens 500 are further displayed. In the shown example, these icons have shapes that represent all the screens.

In this embodiment, because the movement amount of the drag operation is enlarged, corrected, and used as a scroll amount, the scroll amount may be larger than the movement amount of the drag operation. In this case, as described above, the display can be more largely scrolled by the drag operation. However, on the other hand, it may be difficult for the user to intuitively recognize the scroll amount of the display by the drag operation as in the case where the scroll amount is consistent with the movement amount of the drag operation. That is, it may be difficult for the user to intuitively recognize what is happening as a result of scrolling by the drag operation, for example, which home screen 500 is being displayed.

In this embodiment, the display control unit 121 causes the LCD 150 to display the icons 501 and the icon 502. These icons are displayed so that the user can intuitively recognize that the home screen 500 is switched by scrolling the display in the left-right direction. In addition, these icons are displayed so that the user can know which of the home screens 500 is currently being displayed on the LCD 150. For example, while the touch pad 110 detects the drag operation, the display control unit 121 may display the icons 501 and the icon 502 on the LCD 150. Further, in order to indicate that the home screen 500 is switched by the drag operation, the display control unit 121 may display frames of other home screens 500 adjacent to the left and right ends of the LCD 150 while the touch pad 110 detects the drag operation.

In FIG. 10, a display example of the LCDs 250a and 250b while the home screen 500 is scrolled and switched in the information processing apparatus 200 to which this embodiment has been applied is shown. Although the case where this embodiment is applied to the information processing apparatus 100 has been described above, this embodiment may also be equally applied to the information processing apparatus 200. In this case, the touch pads 210a and 210b are used instead of the touch pad 110 in the above description, and LCDs 250a and 250b are used instead of the LCD 150.

In the shown example, the LCDs 250a and 250b are integrally used and the same image as in the example of FIG. 9 is displayed. That is, the home screens 500b and 500c being switched, the icons 501a to 501e indicating all the home screens 500a to 500e, and the icon 502 indicating a displayed area are displayed on the LCDs 250a and 250b. The user performs the drag operation in the left-right direction using either of the touch pads 210a or 210b, so that it is possible to scroll the display of the LCD 250 and switch the home screen 500.

The first embodiment of the present disclosure has been described above. Although an example of scrolling for switching the home screen has been described, this embodiment is not limited thereto, and may be applied to any case in which the display of the display unit is scrolled. In addition, although an example in which the home screens are virtually arranged in the left-right direction has been described, this embodiment is not limited thereto, and the home screens of which left and right ends are connected may be arranged in an endless shape. In addition, although an example of scrolling in the left-right direction of the screen has been described, this embodiment is not limited thereto and may be applied to scrolling in an up-down direction or an oblique direction of the screen.

(2-2. Second Embodiment)

Figure 11:
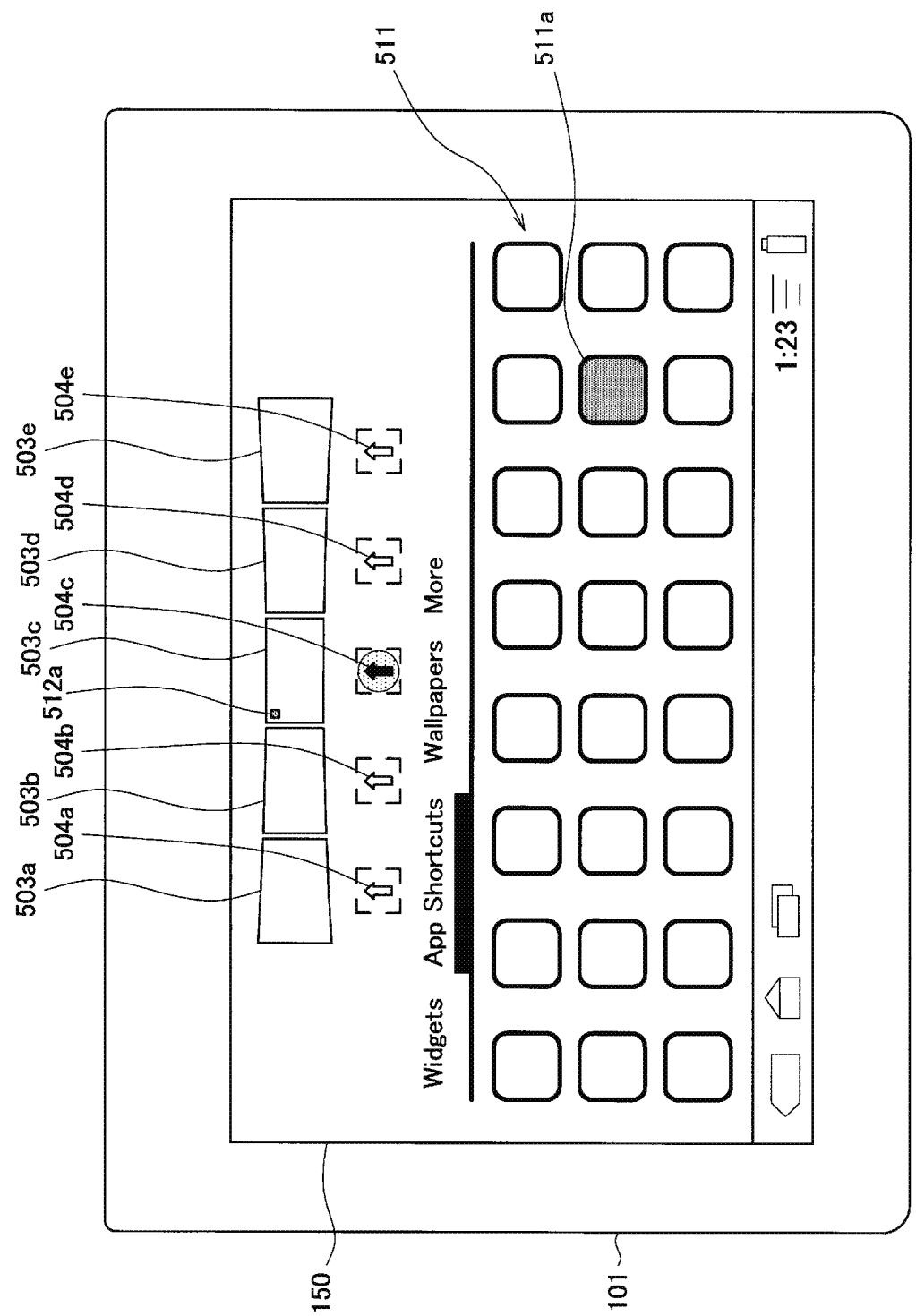
FIG. 11 is a diagram showing a display example of the first information processing apparatus to which a second embodiment of the present disclosure has been applied.
Figure 12:
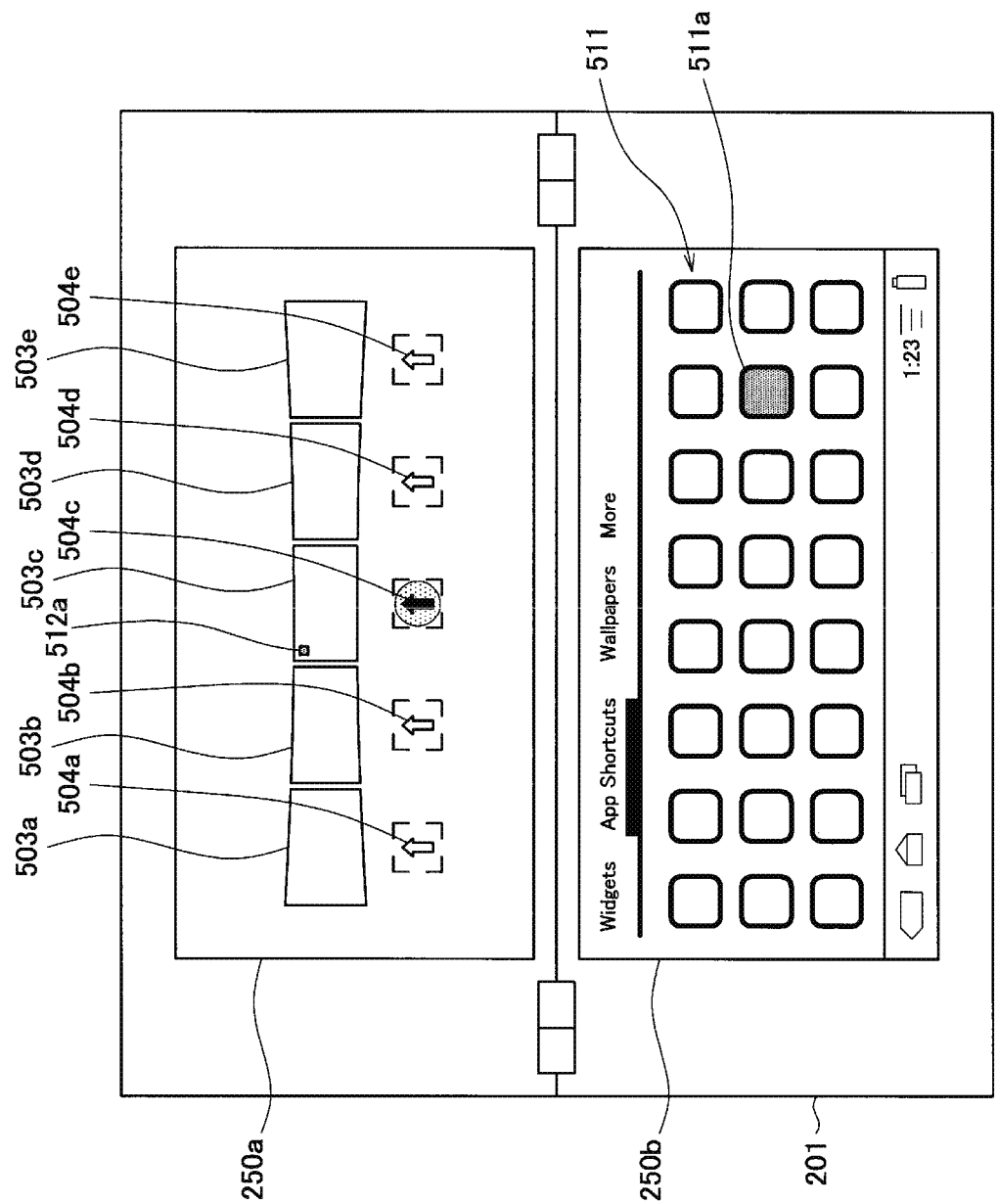
FIG. 12 is a diagram showing a display example of the second information processing apparatus to which the second embodiment of the present disclosure has been applied.
Figure 13:
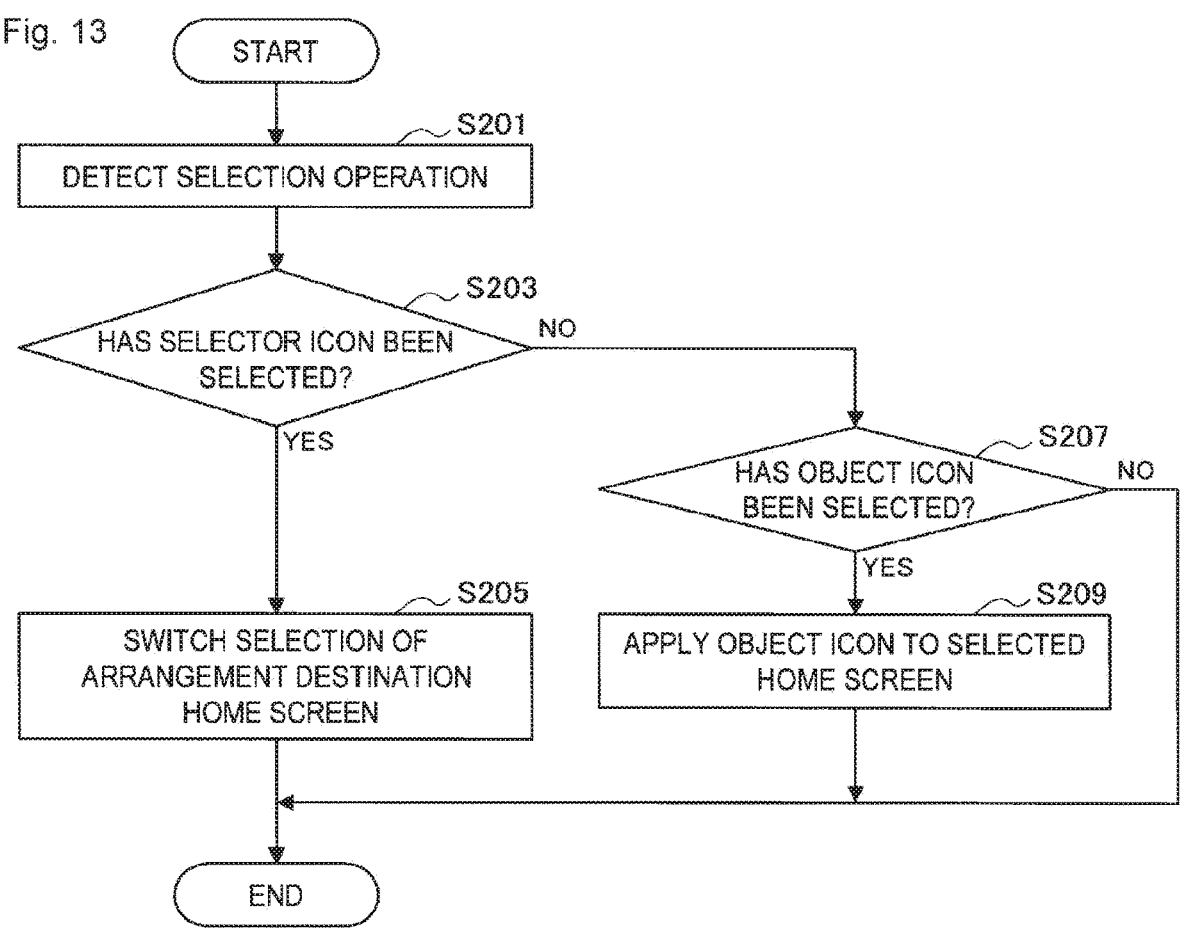
FIG. 13 is a flowchart showing a process of the second embodiment of the present disclosure.

Next, the second embodiment of the present disclosure will be described with reference to FIGS. 11 to 13. FIG. 11 is a diagram showing a display example of the information processing apparatus 100 to which this embodiment has been applied. FIG. 12 is a diagram showing a display example of the information processing apparatus 200 to which this embodiment has been applied. FIG. 13 is a flowchart showing a process of this embodiment.

As described above, in recent years, technology for providing a plurality of screens called home screens on which an icon for starting up an application or the like is arranged and switching a home screen to be displayed according to a user's desire in an information processing apparatus such as a tablet PC or a smart phone has been developed. In this technology, an editing screen for arranging icons on the home screen is provided as a GUI. In the editing screen, for example, a list of object icons capable of being arranged on each home screen and an icon indicating each home screen are displayed. In this case, the user determines an icon to be arranged on each home screen by an operation of dragging an arbitrary icon selected from the list of icons capable of being arranged to an icon indicating any home screen.

However, for example, when the user wants to arrange a number of icons on one home screen, it is troublesome for the user to perform an operation of moving the icons to the icon indicating the home screen one by one by the drag operation.

In addition, when the display unit is divided into a plurality of parts as in the above-described information processing apparatus 200, it is necessary to display a list of object icons at a start point of the drag operation and an icon of the home screen at an end point on the same display unit among a plurality of divisions, and the display of the editing screen has limitations and consequently operability is likely to be degraded.

In this embodiment, there is provided novel technology for making it easy to optionally arrange icons in a plurality of arrangement destinations.

For example, in this embodiment, there is provided an information processing apparatus including a display control unit for causing a display unit to display home screen icons indicating a plurality of home screens, object icons, which may each be arranged on the plurality of home screens, and a selector icon indicating selection of any one of the plurality of home screens, an operation unit for acquiring an operation of selecting the object icon or the selector icon, and a home screen management unit for applying the selected object icon to any one of the home screens indicated to be selected by the selector icon. The operability of a GUI of the information processing apparatus is further improved.

In the above-described information processing apparatus 100, the operation unit is implemented by the touch pad 110, the display control unit and the home screen management unit are implemented by the CPU 120 as the display control unit 121 and the home screen management unit 123, and the display unit is implemented by the LCD 150. Among these, the home screen management unit 123 arranges an icon on the home screen on the basis of the operation acquired by the touch pad 110. The home screen management unit 123 stores information of the object icon arranged on each home screen set in the editing screen or the like in the storage unit 130. In addition, when each home screen is displayed, the home screen management unit 123 reads information of the arrangement of object icons from the storage unit 130 and provides the read information to the display control unit 121. The display control unit 121 arranges and displays the object icons on each home screen according to the information provided from the home screen management unit 123.

In FIG. 11, a state in which the editing screen for arranging icons on the home screen has been displayed in the information processing apparatus 100 is shown. On the LCD 150, home screen icons 503a to 503e, selector icons 504a to 504e, and object icons 511 are displayed.

The home screen icon 503 indicates the home screen 500 set in the information processing apparatus 100. In this embodiment, the five home screens 500a to 500e are set in the information processing apparatus 100. On the LCD 150, the home screen icons each corresponding to the home screens 500a to 500e are displayed. For example, as shown, the home screen icons 503 may be displayed according to visual effects as represented in perspective.

The selector icon 504 is displayed in a position corresponding to the home screen icon 503, and is an icon indicating selection of any one of the home screens 500a to 500e. In the shown example, the selector icons 504a to 504e are displayed in correspondence with the home screen icons 503a to 503e, and the selector icon 504c is selected among these. The user can select any one of the selector icons 504a to 504e by touching the touch pad 110.

The object icons 511 may each be arranged on the home screens 500. An example of the object icon 511 is a widget, a shortcut to an application, wallpaper, or the like. When the user has selected the object icon 511 by touching the touch pad 110, the home screen management unit 123 arranges the widget or the shortcut on the home screen 500 or changes the wallpaper of the home screen 500. The object icon 511 may be displayed using a tab for each type, for example, as shown.

In the shown example, an object icon 511a is selected in a state in which the selector icon 504c has been selected. At this time, the home screen management unit 123 applies the object icon 511a to the home screen 500c of which selection is indicated by the selector icon 504c. For example, if the object icon 511a is a shortcut to an application, the home screen management unit 123 arranges the object icon 511a on the home screen 500c. At this time, the display control unit 121 may display a reduced icon 512a corresponding to the object icon 511a in the home screen icon 503c corresponding to the home screen 500c.

As described above, it is possible to execute an arrangement by an operation of selecting each object icon 511 after selecting the selector icon 504 once without performing the drag operation on all the object icons 511, for example, when a plurality of object icons 511 are arranged in one home screen 500, by displaying the selector icon 504, and it is possible to briefly perform the user's operation.

In FIG. 12, a state in which the editing screen for arranging an icon on the home screen has been displayed in the information processing apparatus 200 is shown. Although the case where this embodiment is applied to the information processing apparatus 100 has been described above, this embodiment may also be equally applied to the information processing apparatus 200. On the LCD 250a, the home screen icons 503a to 503e and the selector icons 504a to 504e are displayed. On the LCD 250b, the object icons 511 are displayed.

As described above, in the information processing apparatus 200, the touch pads 210a and 210b each provided on the LCDs 250a and 250b are separated from each other. Therefore, it is necessary to display the object icons 511 and the home screen icons 503 together on either of the LCDs 250a and 250b in order to arrange the object icons 511 on the home screen 500 by the drag operation directed to the home screen icon 503. This is because the drag operation across the touch pad 210a and the touch pad 210b is difficult. In this case, for example, there is a possibility that most elements of the editing screen are concentrated in one of the LCDs 250a and 250b and operability is degraded due to a tight layout of the editing screen.

On the other hand, in the information processing apparatus 200 to which this embodiment has been applied, an operation for arranging the object icons 511 on the home screen 500 is completed by an operation of selecting the selector icons 504 and the object icons 511. Therefore, it is possible to divide and display the home screen icons 503 and the object icons 511 on the LCDs 250a and 250b and display the editing screen using the entire LCD 250. Thereby, it is possible to improve operability by adding flexibility to the layout of the editing screen.

In FIG. 13, the example of the process according to this embodiment is shown in the flowchart. Although an example of the information processing apparatus 100 will be described in the following description, the case of the information processing apparatus 200 is also similar.

First, the touch pad 110 acquires a selection operation of the user (step S201). Next, the home screen management unit 123 determines whether or not the selector icon 504 has been selected by the selected operation acquired by the touch pad 110 (step S203).

Here, when the selector icon 504 is determined to have been selected, the home screen management unit 123 switches selection of a home screen 500 which is an arrangement destination of the object icon 511 (step S205). For example, if the selector icon 504a has been selected, the home screen management unit 123 selects the home screen 500a as the arrangement destination. The home screen management unit 123 temporarily stores information of the home screen 500 selected as the arrangement destination in the storage unit 130.

On the other hand, if the selector icon 504 is determined not to have been selected in step S203, the home screen management unit 123 determines whether or not the object icon 511 has been selected by the selection operation acquired by the touch pad 110 (step S207).

Here, if the object icon 511 is determined to have been selected, the home screen management unit 123 applies the object icon 511 selected by the operation to the home screen 500 selected as the arrangement destination (step S209). Here, the home screen management unit 123 reads information of the home screen 500 selected as the arrangement destination stored temporarily in the storage unit 130, and adds information of the object icon 511 selected by the operation, for example, the object icon 511a in FIG. 11, as information of the object icon 511 applied to the home screen 500.

The second embodiment of the present disclosure has been described above. Although an example in which the home screen icon and the selector icon are separated and displayed has been described, this embodiment is not limited thereto and the selector icon may be displayed integrally with the home screen icon.

(2-3. Third Embodiment)

Figure 14:
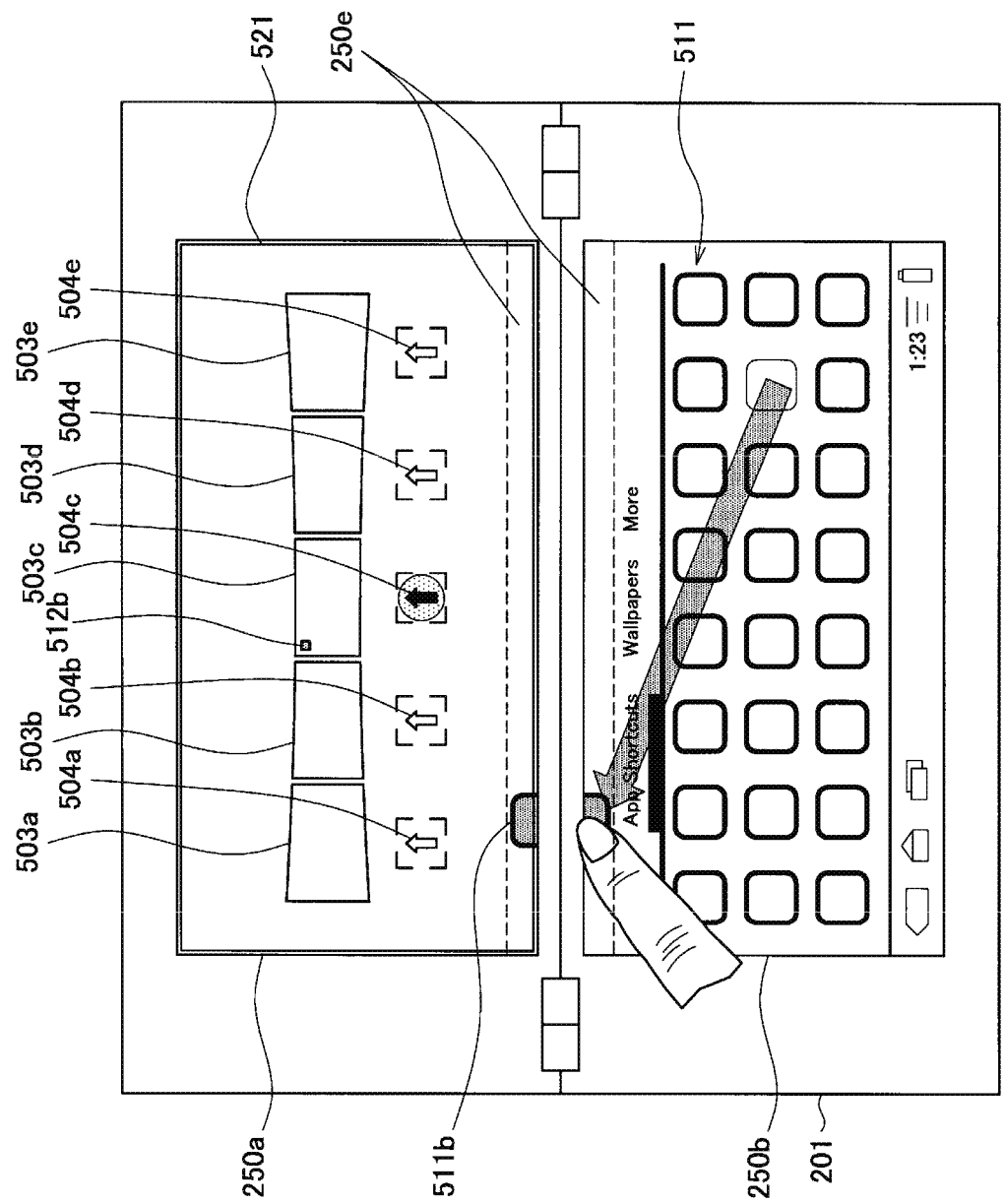
FIG. 14 is a diagram showing a display example of the second information processing apparatus to which a third embodiment of the present disclosure has been applied.
Figure 15:
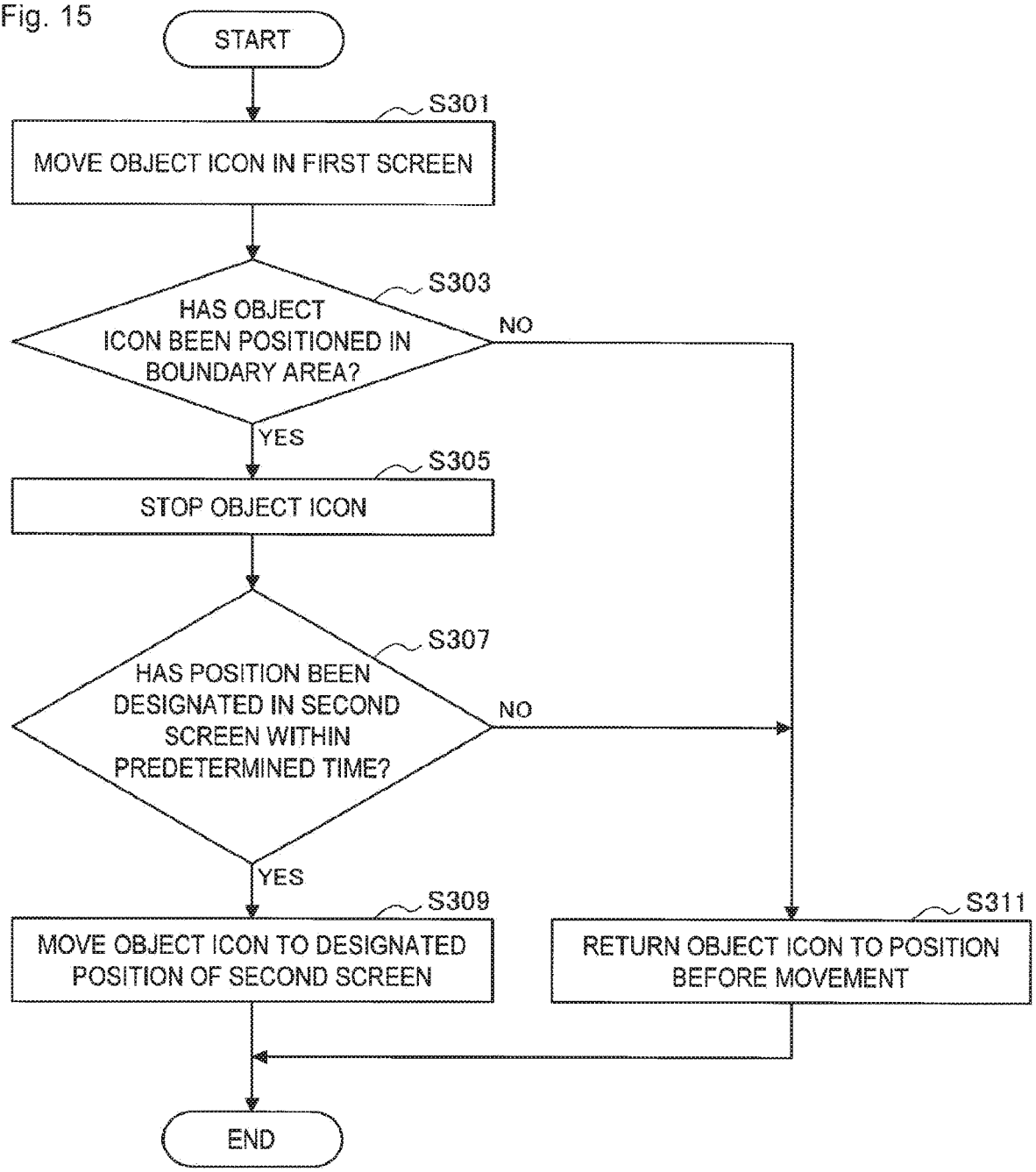
FIG. 15 is a flowchart showing a process of the third embodiment of the present disclosure.

Next, the third embodiment of the present disclosure will be described with reference to FIGS. 14 and 15. FIG. 14 is a diagram showing a display example of the information processing apparatus 200 to which this second embodiment has been applied. FIG. 15 is a flowchart showing a process of this embodiment.

This embodiment may be applied to an information processing apparatus having a plurality of separated display units and a touch pad provided as an operation unit on each display unit, like the above-described information processing apparatus 200. In the information processing apparatus as described above, because the display units are separated, touch pads provided on the display units are equally separated. Therefore, it is difficult to perform a drag operation across these touch pads. Accordingly, it is difficult to move an icon by the drag operation between the plurality of display units in the information processing apparatus as described above.

In this embodiment, there is provided novel technology for making it possible to perform a drag operation across a plurality of separated display units.

For example, in this embodiment, there is provided an information processing apparatus including a first display unit, a first touch pad provided on the first display unit, a second display unit adjacent to the first display unit, a second touch pad provided on the second display unit and having a spacing with the first touch pad, and a display control unit for stopping an icon displayed on the first display unit in a boundary portion between the first display unit and the second display unit for a predetermined time when the icon has been dragged to the boundary portion by first touch of a user with the first touch pad, and moving the icon to a position where second touch with the second display unit has been detected when the second touch of the user with the second touch pad has been detected for the predetermined time. The operability of a GUI of the information processing apparatus is further improved.

In the above-described information processing apparatus 200, the first and second display units are implemented by the LCDs 250a and 250b, respectively, the first and second touch pads are implemented by the touch pads 210a and 210b, respectively, and the display control unit is implemented by the CPU 120 as the display control unit 121.

In FIG. 14, a state in which an editing screen for applying an icon to a home screen has been displayed in the information processing apparatus 200 is shown. On the LCD 250a, the home screens 503a to 503e are displayed. On the LCD 250b, the object icons 511 are displayed.

In this embodiment, the object icons 511 are applied to the home screen 500 corresponding to the home screen icon 503 by the drag operation directed to the home screen icon 503. Further, the selector icons 504a to 504e may be displayed on the LCD 250a, and applications of the object icons 511 to the home screen 500 by the same operation as in the above-described second embodiment may be collectively provided.

In the shown example, an object icon 511b displayed on the LCD 250b is dragged by touch of the user with the touch pad 210b, and moves to a boundary area 250e between the LCD 250b and the LCD 250a. In this state, if the user has released the touch with the touch pad 210b, the object icon 511b is stopped and displayed in the boundary area 250e for a predetermined time. This is a state in which the object icon 511b is pending between the LCD 250b and the LCD 250a. At this time, a pending indication 521 indicating that the object icon 511b is pending may be displayed. In the shown example, the pending indication 521 is displayed in a color different from that of a background of the LCD 250a in an edge portion of the LCD 250a. The pending indication 521 may be displayed in various other forms as long as it is an indication that notifies the user of the fact that the object icon 511b is pending.

As shown, the boundary area 250e is an area set in a boundary portion between the LCD 250a and the LCD 250b. The boundary area 250e may not be displayed on the LCD 250. In addition, the boundary area 250e may not be set on both the LCD 250a and the LCD 250b, and may be set on either one. For example, in the shown example, the boundary area 250e may be set in only the LCD 250b.

In the shown example, if the user touches the touch pad 210a while the object icon 511b is stopped and displayed in the boundary area 250e for the predetermined time, the object icon 511b is moved to and displayed in a position where the user has touched the LCD 250a. A position where the user touches may not be in the boundary area 250e of the side of the LCD 250a, and may be an arbitrary position on the LCD 250a. The object icon 511b may be instantaneously moved to and displayed in a position where the user has touched, and may be displayed according to a display effect such as a moving animation. The user can perform an operation such as a continuous drag operation on the object icon 511b moving to the LCD 250a.

In the information processing apparatus 200 as described above, an operation when the user applies an arbitrary object icon 511 to an arbitrary home screen 500 is as follows. First, the user drags the arbitrary object icon 511 displayed on the LCD 250b using the touch pad 210b, and moves the arbitrary object icon 511 to the boundary area 250e of the side of the LCD 250b. Thereafter, if the user releases the touch on the touch pad 210b, the object icon 511 is stopped and displayed on the boundary area 250e. From this time, if the user touches the touch pad 210a in an arbitrary position of the LCD 250a within a predetermined time, the object icon 511 moves to the position and the drag operation is resumed. By dragging an object icon 511 to a position of a home screen icon 503 indicating a desired home screen 500, the user applies the object icon 511 to the home screen 500.

In FIG. 15, the example of the process according to this embodiment is shown in the flowchart. Although an example in which the object icon 511 moves from the LCD 250b to the LCD 250a in the information processing apparatus 200 will be described in the following description, the case where the object icon 511 reversely moves from the LCD 250a to the LCD 250b is also similar.

First, the display control unit 121 moves the object icon 511 in the LCD 250b, which is a first screen, according to the drag operation of the user detected by the touch pad 210b (step S301).

When touch of the user on the touch pad 210b has been released and the display control unit 121 has ended the movement of the object icon 511, the display control unit 121 determines whether or not the object icon 511 has been positioned in the boundary area 250e (step S303). Here, if the object icon 511 is determined to have been positioned in the boundary area 250e, the display control unit 121 stops the object icon 511 at an end point of the movement in step S301 (step S305). At this time, the display control unit 121 may cause the LCD 250a or the LCD 250b to display the pending indication 521.

Next, the display control unit 121 waits for a predetermined time in a state in which the display of the object icon 511 has been stopped. During this time, the display control unit 121 determines whether or not a position on the LCD 250a, which is a second screen, has been specified by touch of the user on the touch pad 210a (step S307). Here, if the position on the LCD 250a is determined to have been specified, the display control unit 121 moves the object icon 511 stopped and displayed in the boundary area 250e to the position specified on the LCD 250a, which is the second screen (step S309). Thereafter, the user can continuously perform the drag operation of the object icon 511 by touch on the touch pad 210a.

On the other hand, if the object icon 511 is determined not to have been positioned in the boundary area 250e in step S303, the display control unit 121 returns the object icon 511 to a position before movement in step S301 (step S311). In addition, even when the position on the LCD 250a is determined not to have been specified within the predetermined time in step S305, the display control unit returns the object icon 511 to the position before movement in step S301 (step S311). Thereafter, for example, the user initiates a new drag operation on the object icon 511.

Here, the predetermined time of display in a state in which the display control unit 121 has stopped the object icon 511 may be determined, for example, in consideration of a balance between a time necessary for its resumption when the user desires to resume the drag operation on the object icon 511 and a waiting time until the next operation is initiated when the user does not want to resume the drag operation on the object icon 511. In this case, if the predetermined time is short, the object icon 511 is returned to an original position before the user resumes the drag operation. On the other hand, if the predetermined time is too long, a state in which the object icon 511 has been displayed in the boundary area 250e is continued, despite a desire of the user to proceed to the next operation by stopping the drag operation. According to a study for the present disclosure, an example of a predetermined time preferable to provide the user with comfortable operability is 1.5 sec in the information processing apparatus 200.

The third embodiment of the present disclosure has been described above. Although an example of the editing screen of the home screen has been described, this embodiment is not limited thereto and may be applied to all circumstances in which an icon moves between a plurality of display units.

(2-4. Fourth Embodiment)

Figure 20:
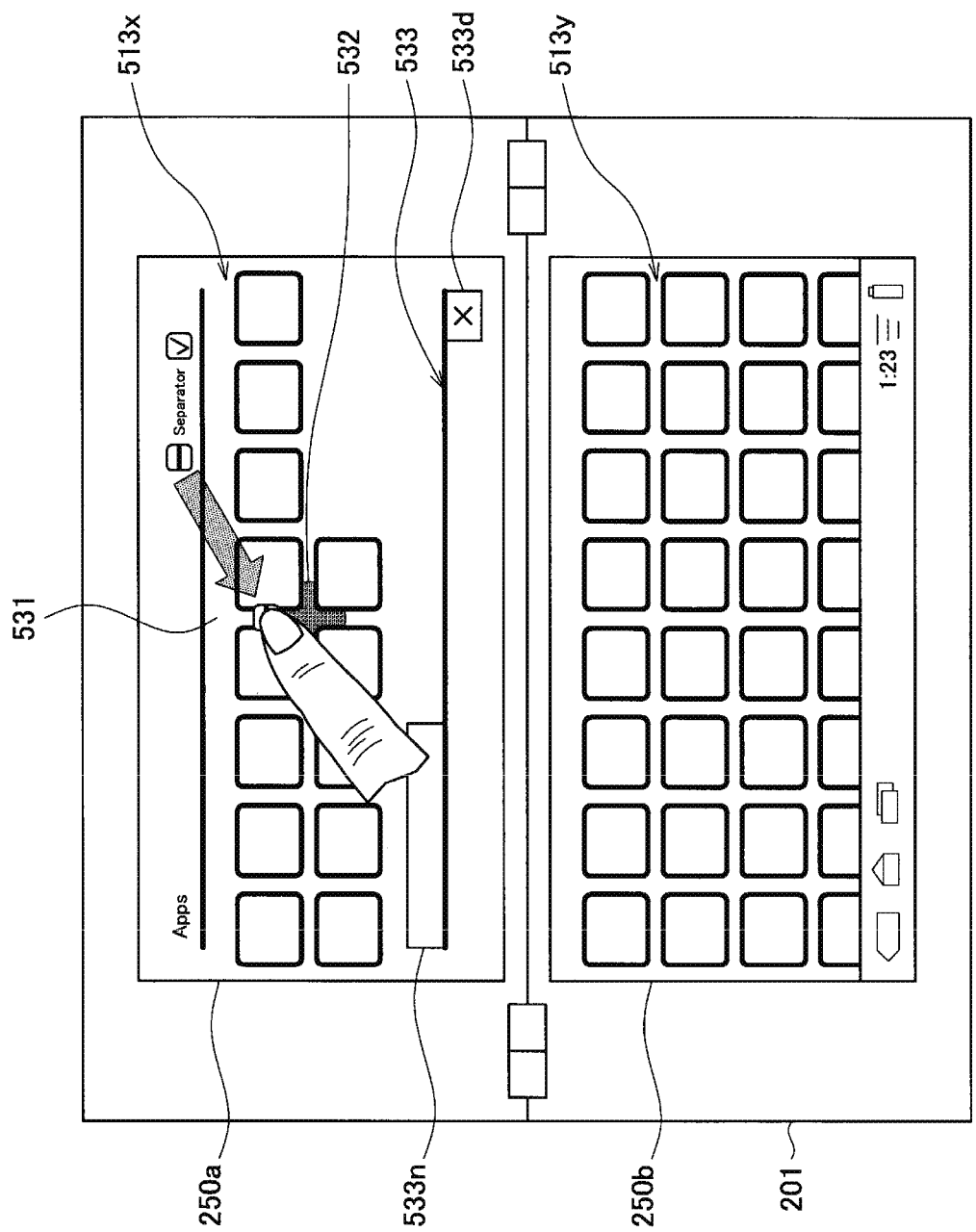
FIG. 20 is a diagram showing a display example of the second information processing apparatus to which the fourth embodiment of the present disclosure has been applied.
Figure 21:
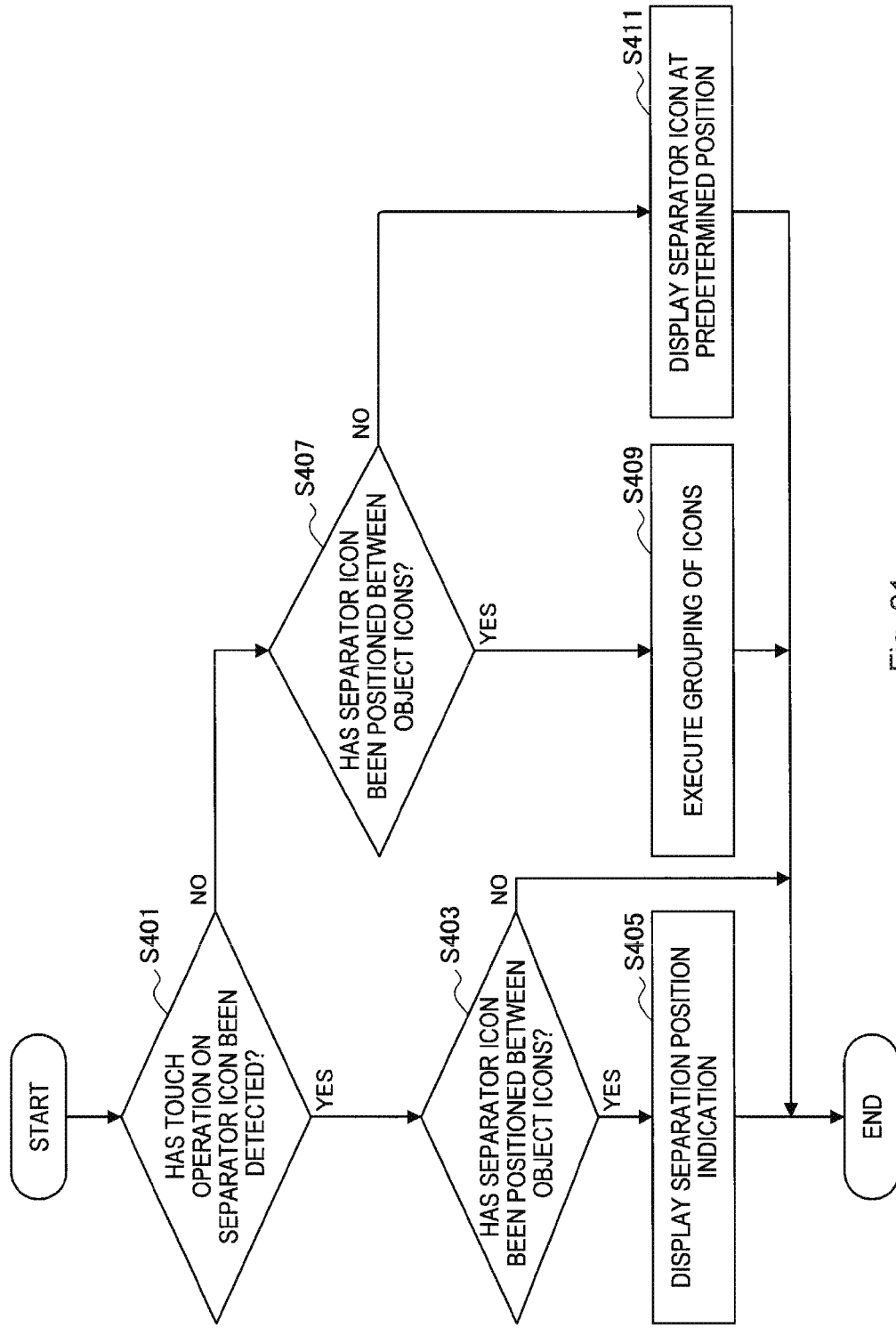
FIG. 21 is a flowchart showing a process of the fourth embodiment of the present disclosure.

Next, the fourth embodiment of the present disclosure will be described with reference to FIGS. 16 to 21. FIGS. 16 to 19 are diagrams showing display examples of the information processing apparatus 100 to which this embodiment has been applied. FIG. 20 is a diagram showing a display example of the information processing apparatus 200 to which this embodiment has been applied. FIG. 21 is a flowchart showing a process of this embodiment.

In recent years, many applications have been installed in information processing apparatuses such as tablet PCs or smart phones to provide the user with many functions. A screen called a launcher screen in which icons for starting up these applications have been arranged is provided. In the launcher screen, for example, the icons for starting up the applications are arranged in a layout according to the user's desire, and an application is started up by the user selecting an icon.

Under such circumstances, there is a demand to further improve the operability of a GUI so as to change an arrangement of icons in a screen in which a number of icons are arranged like the launcher screen.

In this embodiment, there is provided novel technology for facilitating grouping of icons to be displayed on the display unit.

For example, in this embodiment, there is provided an information processing apparatus including a display control unit for causing a display unit to display a plurality of object icons and a separator icon, an operation unit for acquiring an operation of moving the separator icon between a first object icon and a second object icon among the plurality of object icons, and an object management unit for grouping the plurality of object icons into a group including the first object icon and a group including the second object icon. The operability of a GUI of the information processing apparatus is further improved.

In the above-described information processing apparatus 100, the display control unit and the object management unit are implemented by the CPU 120 as the display control unit 121 and the object management unit 124, the operation unit is implemented by the touch pad 110, and the display unit is implemented by the LCD 150. Among these, the object management unit 124 manages an arrangement of object icons in the launcher screen. The object management unit 124 stores information of the arrangement of object icons set in the launcher screen in the storage unit 130. In addition, when the launcher screen is displayed, the object management unit 124 reads the information of the arrangement of object icons from the storage unit 130, and provides the read information to the display control unit 121. The display control unit 121 arranges and displays the icons on the launcher screen according to the information provided from the object management unit 124.

Figure 16:
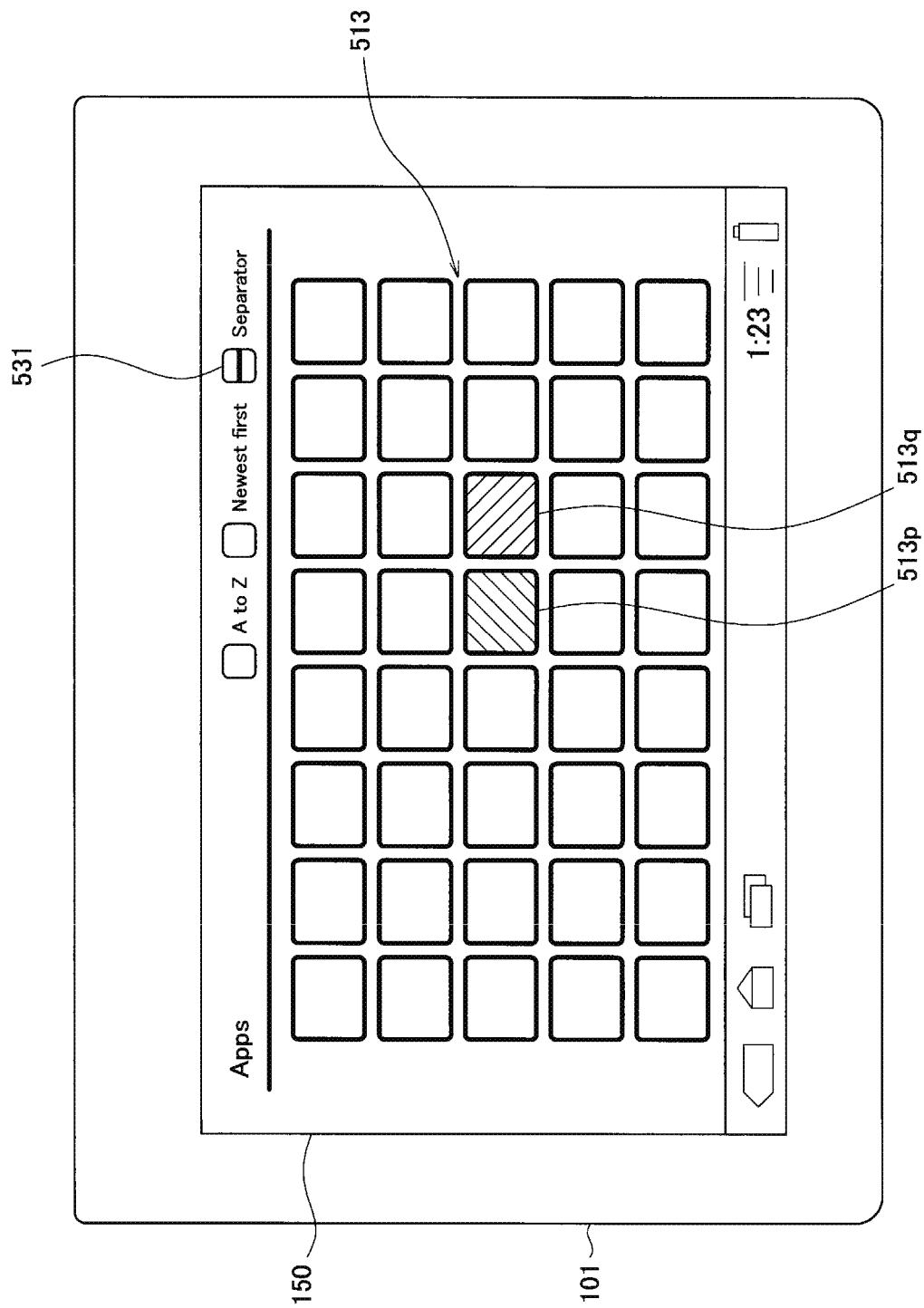
FIG. 16 is a diagram showing a display example of the first information processing apparatus to which a fourth embodiment of the present disclosure has been applied.

In FIG. 16, a state in which the launcher screen has been displayed on the LCD 150 in the information processing apparatus 100 is shown. On the LCD 150, object icons 513 and a separator 531 are displayed.

The object icons 513 are icons for starting up applications and the like. Although the object icons 513 may be arranged by various conditions, for example, such as order of name, order of new arrival, and order set by the user, in the launcher screen, the object icons are arranged in the order set by the user in the shown example. The object icons 513 configure columns arranged from left to right and rows arranged from top to bottom on the screen. The user can change the order of arrangement by moving the object icons 513 in the drag operation using the touch pad 110.

The separator icon 531 is an icon for specifying a separation position for grouping the object icons 513. The separator icon 531 may be, for example, an icon in which a horizontal line is drawn as shown. The separator icon 531 may be initially displayed in a predetermined position of the LCD 150 on which the launcher screen is displayed, and moved by a drag operation of the user using the touch pad 110. In the shown example, it is assumed that the user wants to separate and group the object icons 513 between an object icon 513$p$ and an object icon 513$q$.

Figure 17:
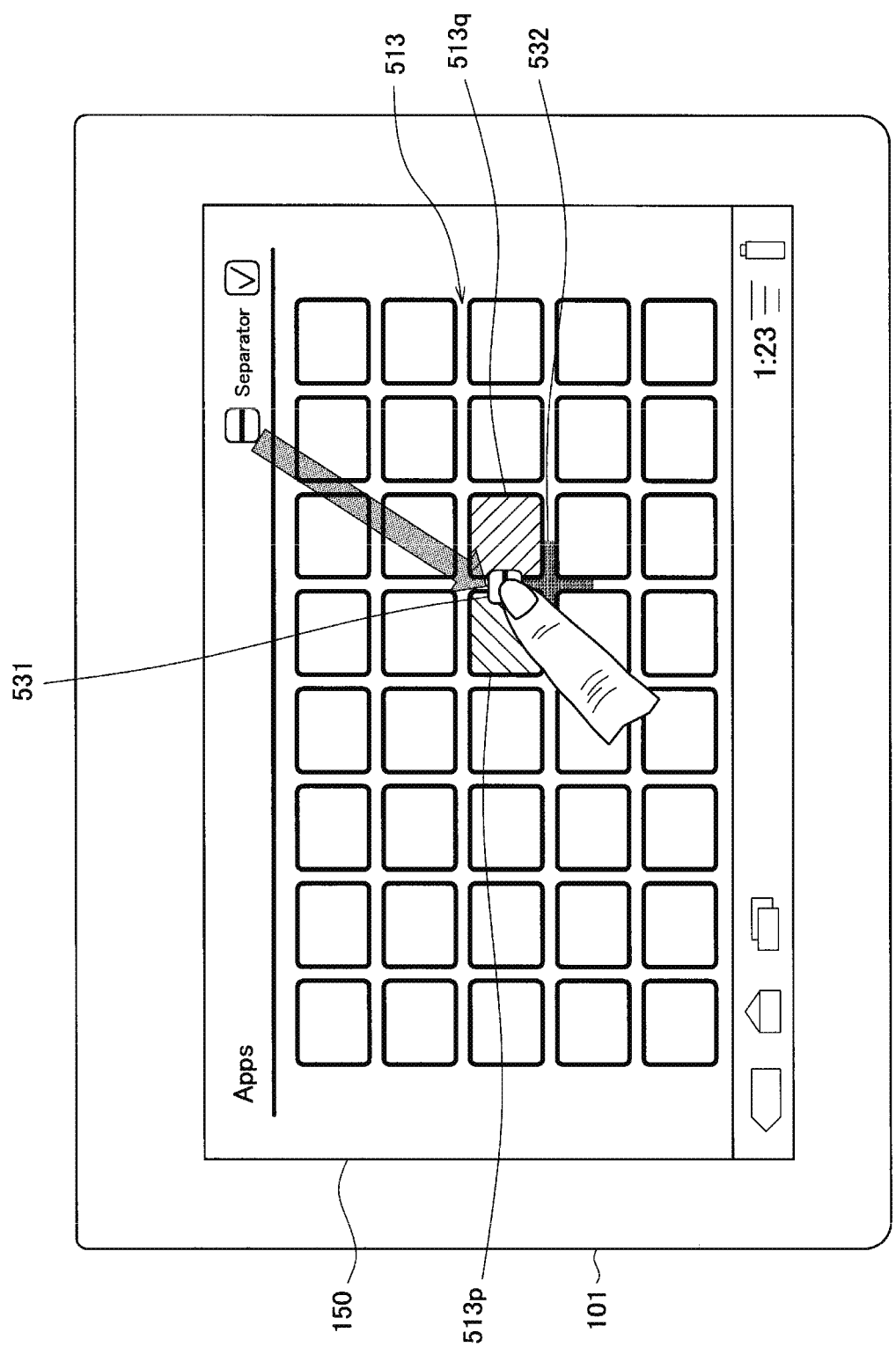
FIG. 17 is a diagram showing a display example of the first information processing apparatus to which the fourth embodiment of the present disclosure has been applied.

In FIG. 17, a state in which the user has moved the separator icon 531 by the drag operation from the state of FIG. 16 is shown. In this case, a separation position indication 532 may be further displayed on the LCD 150.

In the shown example, the separator icon 531 is moved by the drag operation of the user, and positioned between the object icon 513$p$ and the object icon 513$q$. Here, if the user has ended the drag operation of the separator icon 531 and the position of the separator icon 531 has been fixed, the object icons 513 are separated and grouped between the object icon 513$p$ and the object icon 513$q$. The separation position indication 532 is displayed between the object icon 513$p$ and the object icon 513$q$ so as to indicate its separation position. The separation position indication 532 is displayed, so that the user can know in advance how the object icons 513 are grouped when the drag operation of the separator icon 531 has ended in a current position.

Figure 18:
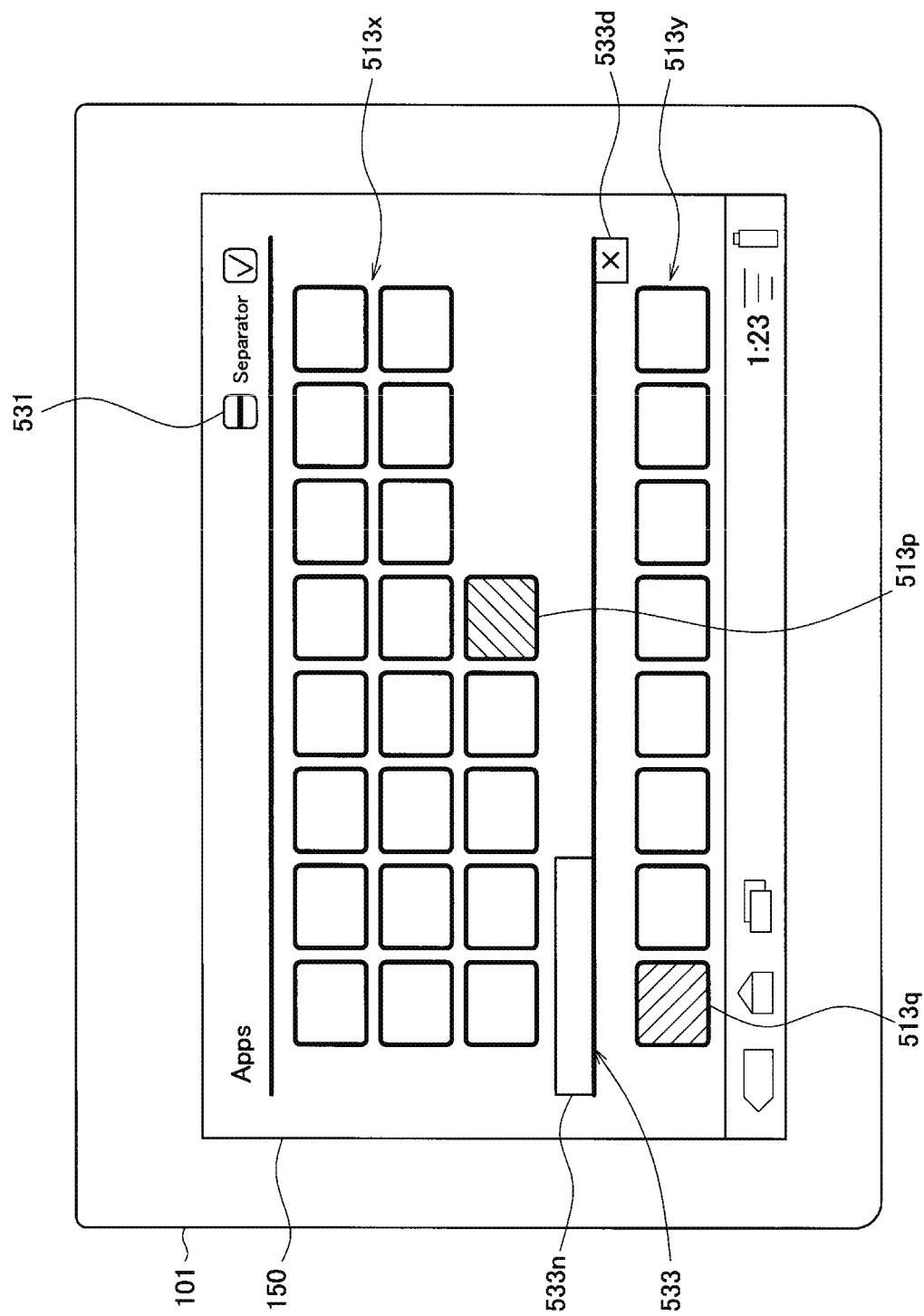
FIG. 18 is a diagram showing a display example of the first information processing apparatus to which the fourth embodiment of the present disclosure has been applied.

In FIG. 18, a state in which the user has ended the drag operation on the separator icon 531 by releasing touch on the touch pad 110 in the state of FIG. 17 is shown. In this case, the separator icon 531 changes to a separator 533. The object icons 513 are grouped into an object icon group 513$x$ and an object icon group 513$y$ by setting the separator 533 to a boundary.

Here, the object icon group 513$x$ is a group of object icons 513 arranged in order before the object icon 513$p$. In addition, the object icon group 513$y$ is a group of object icons 513 arranged in order after the object icon 513$q$. A row including the object icons 513$p$ and 513$q$ is divided, so that the object icon 513$p$ is arranged in the end of a last row of the object icon group 513$x$, and the object icon 513$q$ is arranged in the front of a first row of the object icon group 513$y$.

The separator 533 is displayed to separate the object icon group 513$x$ and the object icon group 513$y$. In the shown example, the separator 533 extends linearly in the left-right direction. The separator 533 may have a name input field 533$n$ and a deletion icon 533$d$. The object icons 513 included in the object icon group 513$x$ and the object icons 513 included in the object icon group 513$y$ may be mutually exchanged, for example, by the drag operation. In this case, the user can move the object icon 513 included in the object icon group 513$x$ to the object icon group 513$y$, or reversely move the object icon 513 included in the object icon group 513$y$ to the object icon group 513$x$, by the drag operation.

The name input field 533$n$ is a field that is used to assign a name to the separator 533. For example, the user assigns the name to the separator 533 by selecting the name input field 533$n$ and inputting characters using an on-screen keyboard displayed on the LCD 150, or the like. The user can assign a desired name to the separator 533 by the name input field 533$n$, and thus easily find a desired object icon 513, for example, in the launcher screen.

The deletion icon 533$d$ is a button that is used to delete the separator 533. The user can delete the separator 533 by selecting the deletion icon 533$d$. If the separator 533 is deleted, the arrangement of the object icons 513 is returned to an arrangement before grouping by the indication of the separator 533. In the shown example, if the user selects the deletion icon 533$d$, the arrangement of the object icons 513 is returned to the arrangement shown in FIG. 16. The deletion icon 533d is displayed so that the user can re-group the object icons 513 by an easy operation or combine the groups of the object icons 513.

In addition, in a state in which the separator 533 has been displayed, another separator icon 531 may be further displayed. The user can further group the object icons 513 included in the object icon group 513x or the object icon group 513y by moving the other separator icon 531 by the drag operation.

Figure 19:
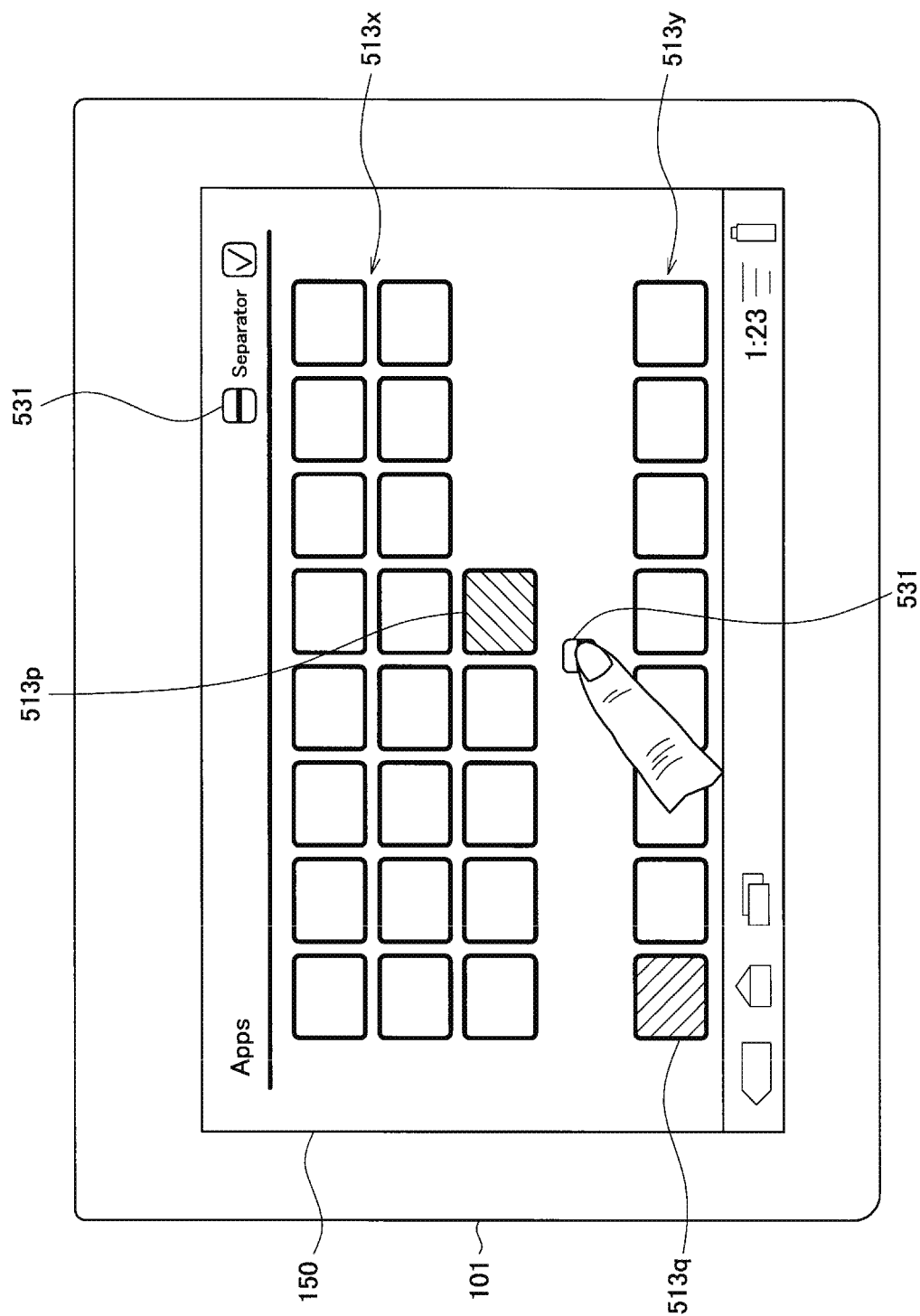
FIG. 19 is a diagram showing a display example of the first information processing apparatus to which the fourth embodiment of the present disclosure has been applied.

In FIG. 19, a state in which the user touches the touch pad 110 again and selected the separator 533 in the state of FIG. 18 is shown. In this case, the separator 533 changes to the separator icon 531. At this time, the object icon group 513x and the object icon group 513y maintain the grouped state.

As described above, the separator icon 531 may be moved by the drag operation of the user using the touch pad 110. The user can change a separation position of grouping of the object icons 513 by re-moving the separator icon 531 and arranging the separator icon 531 between two arbitrary object icons 513. In this case, the separation position indication 532 is also displayed according to movement of the separator icon 531, and the separator icon 531 changes to the separator 533 after the arrangement.

In FIG. 20, a state in which the launcher screen is displayed on the LCD 250 in the information processing apparatus 200 is shown. Although the case where this embodiment is applied to the information processing apparatus 100 has been described above, this embodiment may also be equally applied to the information processing apparatus 200. On the LCD 250, the object icons 513, the separator icon 531, the separation position indication 532, and the separator 533 are displayed. The user can group the object icons 513 in an arbitrary separation position by moving the separator icon 531 in the drag operation using the touch pad 210 and arranging the separator icon 531 between two arbitrary object icons 513.

In the information processing apparatus 200, because the LCD 250 and the touch pad 210 are each divided into two parts, the separator icon 531 may be stopped in a boundary portion between the LCD 250a and the LCD 250b for a predetermined time, for example, using the above-described third embodiment.

In FIG. 21, the example of the process according to this embodiment is shown in the flowchart. Although an example of the information processing apparatus 100 will be described in the following description, the case of the information processing apparatus 200 is also similar.

First, the object management unit 124 determines whether or not touch of the user on the separator icon 531 has been detected by the touch pad 110 (step S401). The touch of the user on the separator icon 531 is detected during the drag operation on the separator icon 531. That is, if the touch of the user on the separator icon 531 has been detected by the touch pad 110, the separator icon 531 is in a state in which it is moved by the drag operation of the user. On the other hand, if the touch of the user on the separator icon 531 has not been detected by the touch pad 110, the separator icon 531 is in a state in which it is initially displayed in a predetermined position or a state in which it has been released from the drag operation of the user in any position on the LCD 150.

Here, if the touch of the user on the separator icon 531 is determined to have been detected, the object management unit 124 determines whether or not the separator icon 531 has been positioned between the object icons 513 (step S403). Here, if the separator icon 531 is determined to have been positioned between the object icons 513, the display control unit 121 displays the separation position indication 532 on the LCD 150 (step S405). If the separator icon 531 is determined not to have been positioned between the object icons 513, the display control unit 121 continues display according to the drag operation on the separator icon 531 without displaying the separation position indication 532.

On the other hand, if the touch of the user on the separator icon 531 is determined not to have been detected in step S401, the object management unit 124 further determines whether or not the separator icon 531 has been positioned between the object icons 513 (step S407). Here, if the separator icon 531 is determined to have been positioned between the object icons 513, the object management unit 124 groups the object icons 513 so that the object icons 513 positioned on both sides of the separator icon 531 belong to different groups (step S409). Step S409 corresponds to the case where the separator icon 531 has been released from the drag operation in a valid position as a separation position of grouping of the object icons 513.

In addition, if the separator icon 531 is determined not to have been positioned between the object icons 513, the display control unit 121 displays the separator icon 531 at a predetermined position on the LCD 150 (step S411). Step S411 corresponds to a state in which the separator icon 531 is initially displayed to wait for the drag operation by the user and the case where the separator icon 531 is released from the drag operation in an invalid position for grouping and consequently returned to an initial display position.

The fourth embodiment of the present disclosure has been described above. Although an example of the launcher screen for starting up an application has been described, this embodiment is not limited thereto and may be applied to any case in which a plurality of icons displayed on the display unit of the information processing apparatus are grouped.

In addition, although an example of grouping in which the object icons positioned on the left and right of the separator icon belong to different groups has been described, this embodiment is not limited thereto. For example, grouping may be performed so that the object icons above and below the separator icon belong to different groups. Further, these cases may be switched. In this case, the separator icon may be set, for example, to be moved and rotated by the user's operation via a touch panel, and grouping may be executed by changing a separation position in the left-right direction if a line drawn in the separator icon is a horizontal line and in the up-down direction if the line drawn in the separator icon is a vertical line by rotation.

(2-5. Fifth Embodiment)

Figure 22:
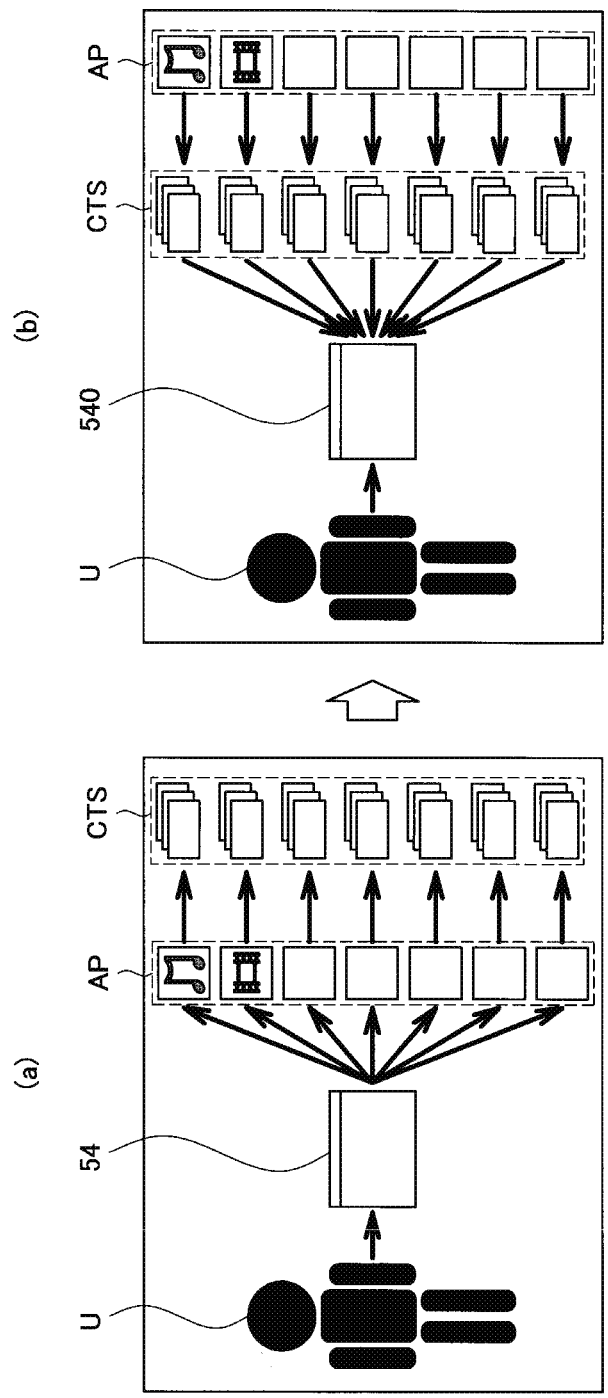
FIG. 22 is a diagram conceptually illustrating a fifth embodiment of the present disclosure.
Figure 23:
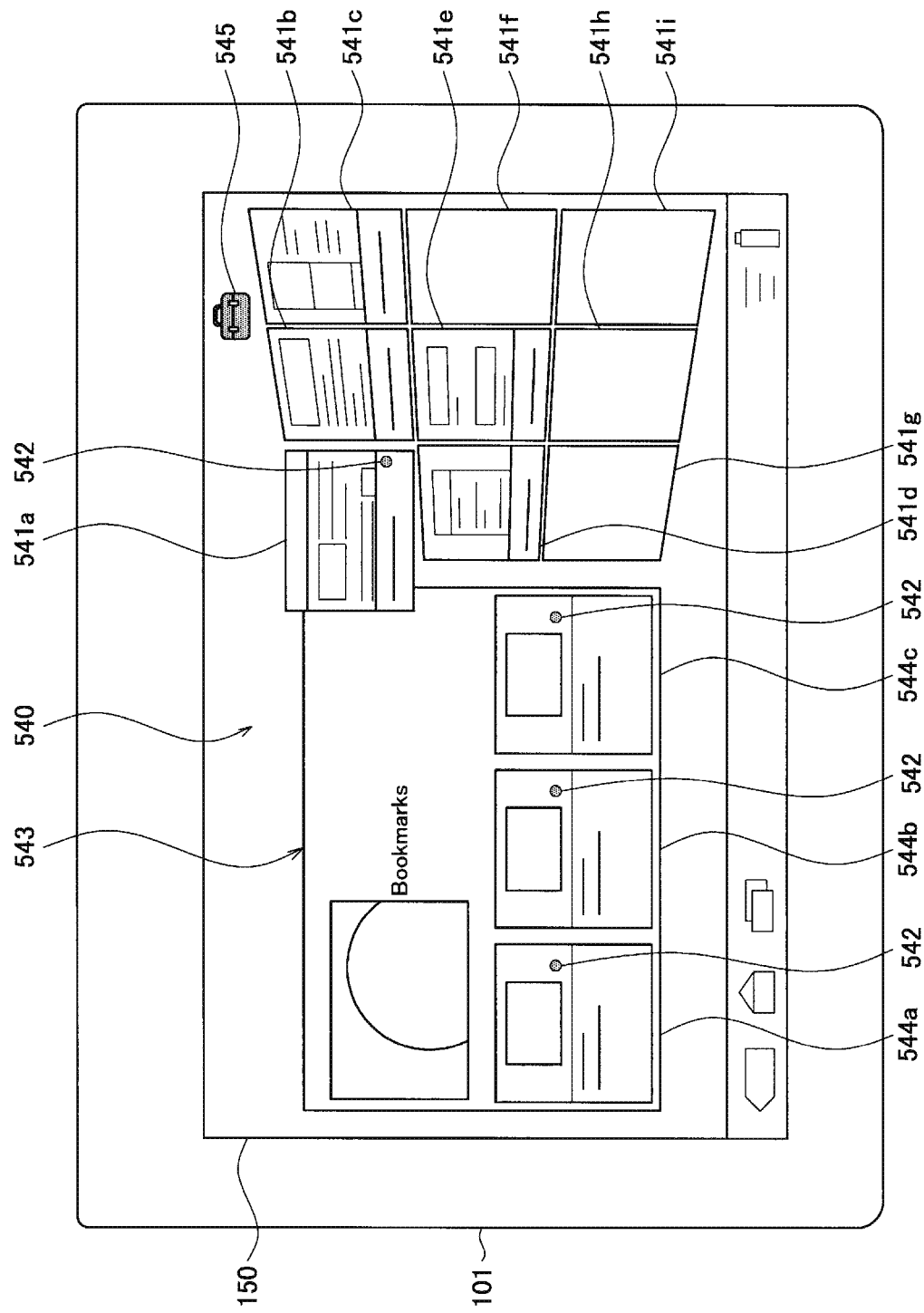
FIG. 23 is a diagram showing a display example of the first information processing apparatus to which the fifth embodiment of the present disclosure has been applied.
Figure 24:
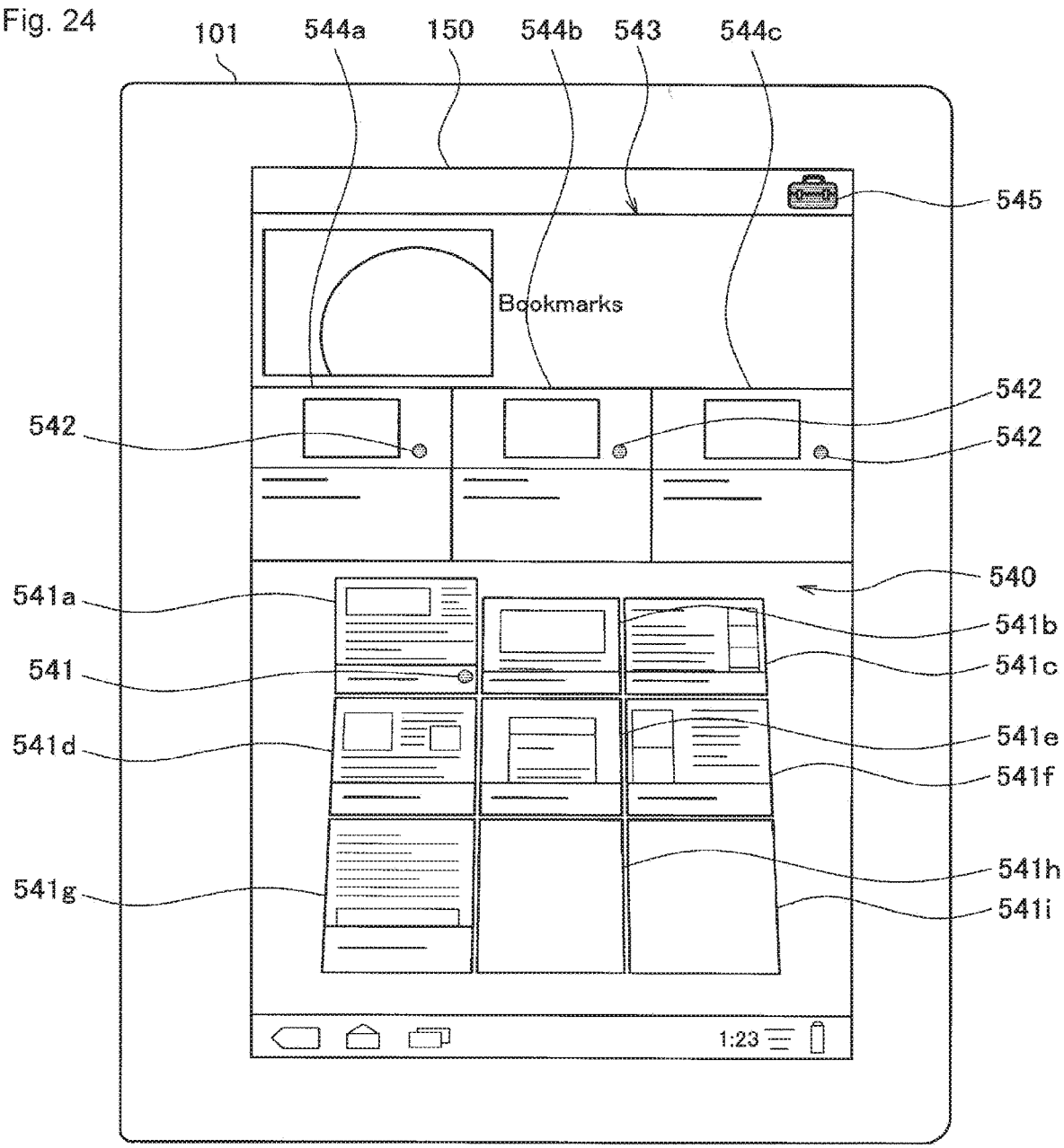
FIG. 24 is a diagram showing another display example of the first information processing apparatus to which the fifth embodiment of the present disclosure has been applied.
Figure 25:
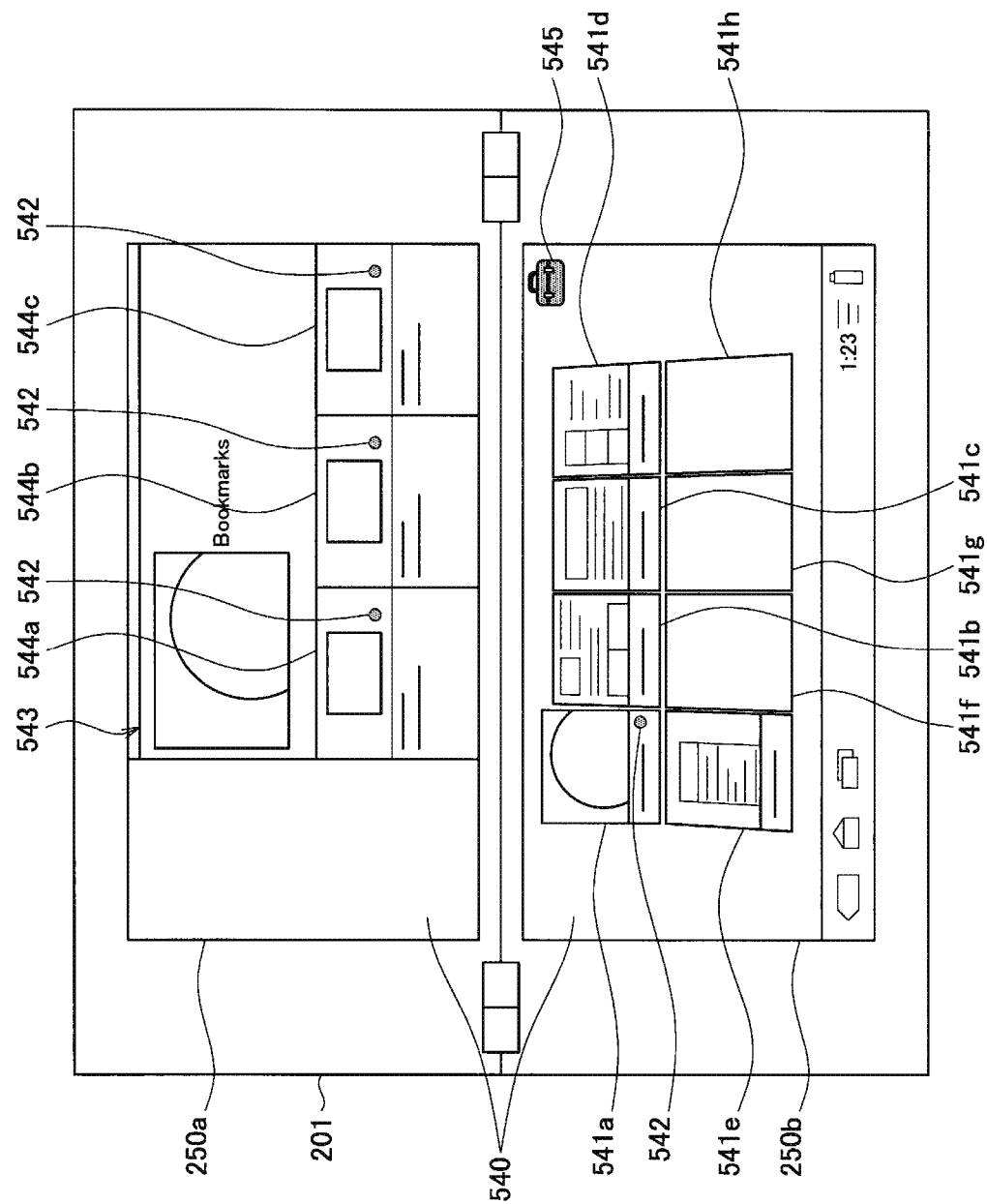
FIG. 25 is a diagram showing a display example of the second information processing apparatus to which the fifth embodiment of the present disclosure has been applied.
Figure 26:
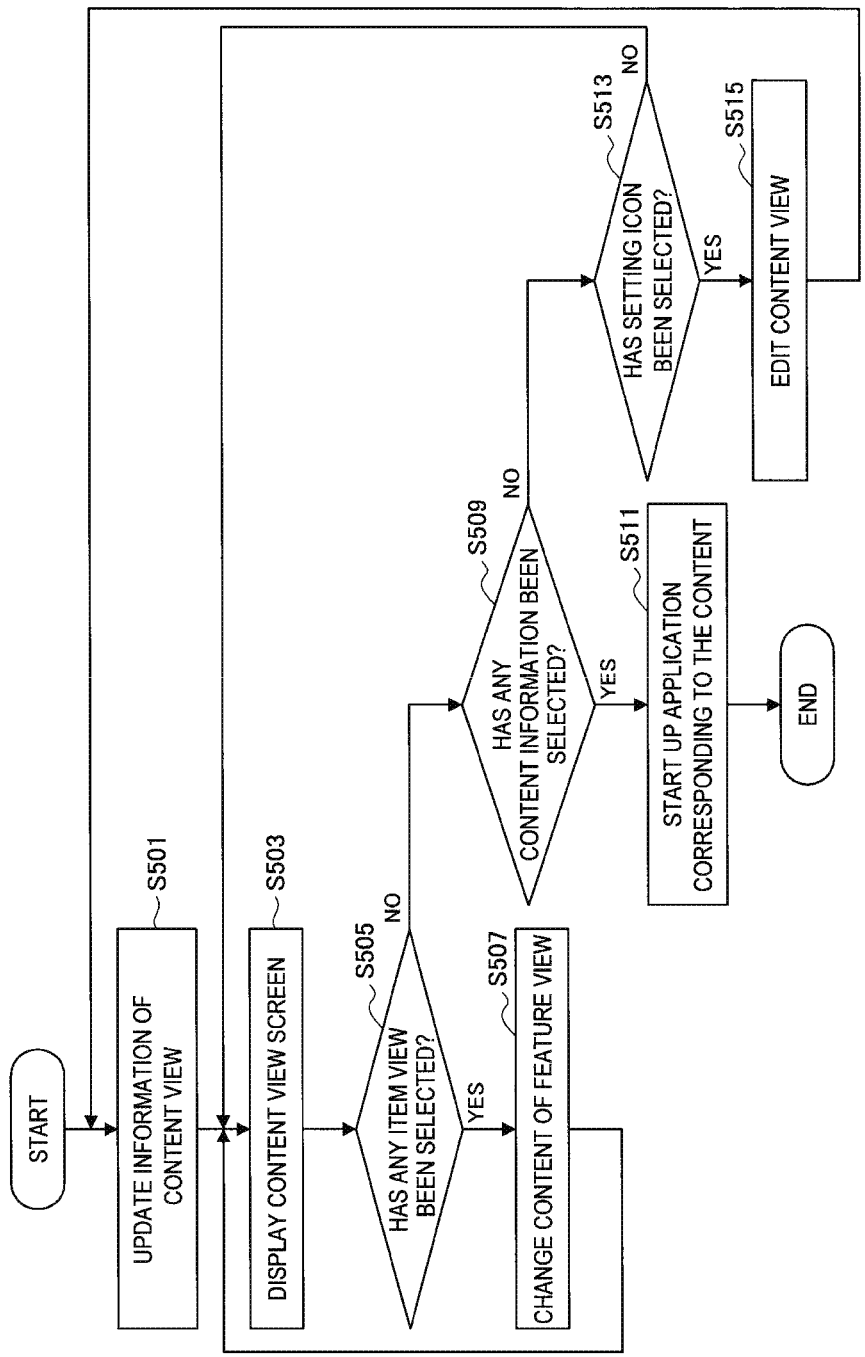
FIG. 26 is a flowchart showing a process of the fifth embodiment of the present disclosure.
Figure 27:
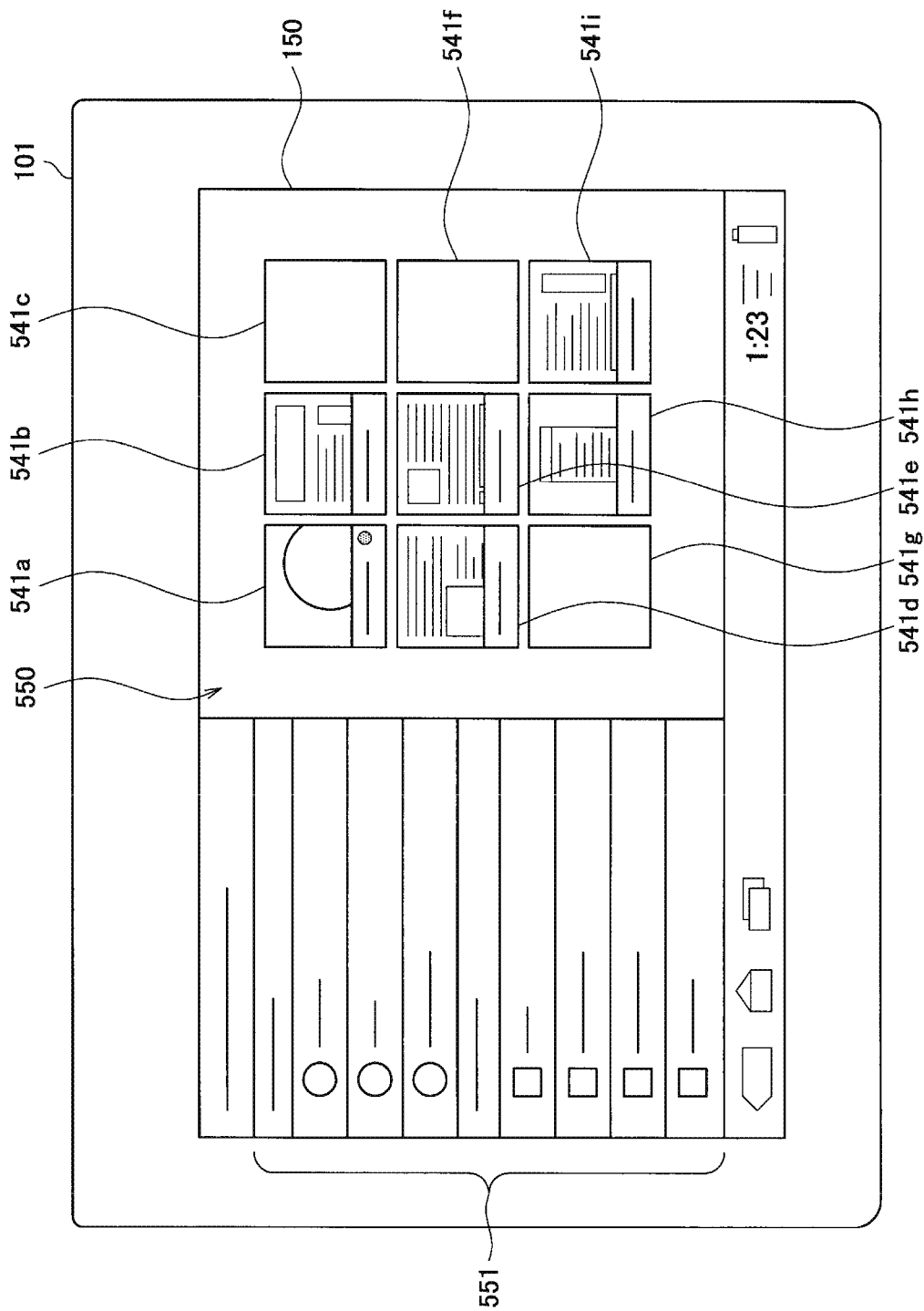
FIG. 27 is a diagram showing a display example of an editing screen according to the fifth embodiment of the present disclosure.

Next, the fifth embodiment of the present disclosure will be described with reference to FIGS. 22 to 27. FIG. 22 is a diagram conceptually illustrating this embodiment. FIG. 23 is a diagram showing a display example of the information processing apparatus 100 to which this embodiment has been applied. FIG. 24 is a diagram showing another display example of the information processing apparatus 100 to which this embodiment has been applied. FIG. 25 is a diagram showing a display example of the information processing apparatus 200 to which this embodiment has been applied. FIG. 26 is a flowchart showing a process of this embodiment. FIG. 27 is a diagram showing a display example of an editing screen according to this embodiment.

In recent years, applications for providing the user with any content has been frequently installed in information processing apparatuses such as tablet PCs or smart phones. For example, a player application for providing music content or video content, a browser application for providing web content, and the like are well known. In these applications, content capable of being provided via an application is usually updated, for example, by acquiring new content by way of a network.

Under such circumstances, there is a demand to further improve the operability of a GUI for users who want to access various content provided via various applications.

In this embodiment, there is provided novel technology for making it easy to access content provided via an application.

For example, in this embodiment, there is provided an information processing apparatus including a view information management unit for generating view information including content information regarding at least part of content provided via an application, a display control unit for causing a display unit to display the view information, an operation unit for acquiring an operation of a user who selects the content information included in the displayed view information, and an application management unit for starting up the application that provides the selected content information. The operability of a GUI of the information processing apparatus is further improved.

In the above-described information processing information 100, the view information management unit, the display control unit, and the application management unit are implemented by the CPU 120 as the view information management unit 125, the display control unit 121, and the application management unit 126, and the operation unit is implemented by the touch pad 110, and the display unit is implemented by the LCD 150.

Among these, the view information management unit 125 manages information of a content view indicating content information regarding content provided by an application installed in the information processing apparatus 100. The view information management unit 125 stores the information of the content view in the storage unit 130. In addition, the view information management unit 125 may communicate with the network via the communication unit 140 and update the information of the content view.

In addition, the application management unit 126 manages the application installed in the information processing apparatus 100. On the basis of selection of content information included in a content view displayed by the display control unit 121 on the LCD 150, the application management unit 126 may start up an application for providing content corresponding to the content information.

In FIG. 22, (a) as an example in which this embodiment is not applied and (b) as an example in which this embodiment is applied are shown. In each case, the user accesses content CTS that is provided via an application AP. Thus, an application selection screen 54 is displayed in the example of (a) and a content view screen 540 is displayed in the example of (b).

In the example of (a), the application AP is started up from the application selection screen 54. On a screen of the started-up application AP, information of the content CTS provided by the application AP to the user is displayed, and the user selects desired content CTS from among pieces of the content CTS.

In this case, a user U does not know a type of content CTS to be provided by the application AP if the application AP is not started up. For example, in the case of music content, it is possible to know current popular content only after the player application is started up. In addition, for example, in the case of web content, it is possible to know whether or not bookmarked web content has been updated only after a browser is started up.

As described above, in the example of (a), the user U starts up the application AP in a state in which content CTS to be provided is unknown. Therefore, even when a certain application has been started up, content CTS as a target of interest may not be found. Alternatively, even when there is content CTS that is the target of interest being provided by another application AP, the user U may be unaware of the presence of content CTS because the application AP has not been started up.

On the other hand, in the example of (b), desired content CTS is selected in the content view screen 540. According to the selection of content CTS by the user, an application for providing the content CTS is started up.

In this case, using the content view screen 540, the user U knows content CTS to be provided by the application AP even when the application AP is not started up. For example, in the case of music content, it is possible to know recent popular content even when the player application is not started up. In addition, for example, in the case of web content, it is possible to know whether or not bookmarked web content has been updated even when the browser is not started up.

As described above, in the example of (b), using the content view screen 540, the user U starts up the application AP for providing content CTS by checking the content CTS capable of being provided by the application AP and selecting content CTS serving as a target of interest from among pieces of the content CTS. Therefore, the user U can easily access the content CTS serving as the target of interest. In addition, content CTS of various applications AP is displayed on the content view screen 540, so that the user U is likely to find unexpected new content CTS or applications AP, for example, as when content CTS serving as a target of interest is provided by an unexpected application AP.

In FIG. 23, a state in which the content view screen 540 has been displayed in the information processing apparatus 100 is shown. Item views 541a to 541i, a feature view 543, and a setting icon 545 are included in the content view screen 540 displayed on the LCD 150.

The item view 541 is a view that presents content information for each item. The item used here is a set into which content capable of being provided by the information processing apparatus 100 is classified by predetermined criteria. For example, the item may be a set into which content to be provided by a certain application has been classified for each attribute. Specifically, the item may be "bookmarked web content," "top music content of hit chart," or the like.

In the shown example, 9 item views 541a to 541i are displayed. In these item views, for example, content information of bookmarked web content, content information of music content that is ranked high in the hit chart, and the like may be displayed. Like the item views 541f to 541i, an item view 541 to which no item is allocated may exist as a blank field. Content may be displayed by allocating items to all item views 541.

In addition, a new arrival icon 542 may be displayed on the item view 541 if information of displayed content includes new arrival information that is not previously displayed. The new arrival icon 542 is displayed so that the user can easily find information of content that is not checked.

The feature view 543 is a view that presents content in further detail in units of items. In the shown example, content information is sequentially displayed one by one in the item view 541, but three pieces of content information 544a to 544c are displayed on the feature view 543. The feature view 543 may be displayed with respect to an item view 541 selected by the user or an item view 541 including new arrival information among the item views 541*a* to 541*i*. In the shown example, the item view 541*a* includes new arrival information and the feature view 543 is displayed with respect to the item view 541*a*. The new arrival icon 542 may also be displayed in the content information 544*a* to 544*c* included in the feature view 543.

In the shown example, an application corresponding to the item view 541*a* is a browser application, and information of bookmarked web content is displayed in the content information 544*a* to 544*c*. Thus, if the user selects any piece of web content information displayed as the content information 544*a* to 544*c* by touch on the touch pad 110, the browser application is started up, and web content indicated by the selected content information 544 is displayed.

An item view 541 corresponding to the feature view 543 may be displayed according to a display effect such as pop-up like an item view 541*a*. According to the display effect, the user can easily know the feature view 543 corresponding to a certain item view 541.

The setting icon 545 is an icon for displaying an editing screen to be described later. The user selects the setting icon 545 by an operation using the touch pad 110, so that the editing screen can be displayed and content of the item view 541 can be edited In FIG. 24, another example in which the content view screen 540 has been displayed in the information processing apparatus 100 is shown. In the shown example, the information processing apparatus 100 has the LCD 150 arranged to be vertically long.

In the shown example, the item views 541*a* to 541*i* are displayed in a lower portion of the LCD 150, and the feature view 543 is displayed in an upper portion of the LCD 150. As described above, for example, the item views 541 and the feature view 543 may be displayed on the LCD 150 in different arrangements according to a direction in which the information processing apparatus 100 is held.

In FIG. 25, a state in which the content view screen 540 has been displayed in the information processing apparatus 200 is shown. Although the case where this embodiment is applied to the information processing apparatus 100 has been described above, this embodiment may also be equally applied to the information processing apparatus 200.

In content view screens 540 displayed on the LCD 250 of the information processing apparatus 200, the item views 541*a* to 541*h* are displayed on the LCD 250*b*, and the feature view 543 is displayed on the LCD 250*a*. In the example of the information processing apparatus 200, 8 item views different from the example of the information processing apparatus 100 are displayed. As described above, the number of item views 541 to be displayed may be appropriately changed according to an arrangement of the entire content view screen 540.

In FIG. 26, the example of the process in this embodiment is shown in the flowchart. Although the example of the information processing apparatus 100 will be described in the following description, the case of the information processing apparatus 200 is also similar.

First, the view information management unit 125 updates information of a content view (step S501). Specifically, the view information management unit 125 acquires content information with respect to an application corresponding to each item view 541. The view information management unit 125 arranges the content information, for example, in order of update date, popularity, or the like, and extracts a predetermined number of pieces of content information from the front of the arrangement. For example, the predetermined number may be the number of pieces capable of being displayed as the item view 541 or the feature view 543. The view information management unit 125 stores information of an updated content view in the storage unit 130.

Next, the view information management unit 125 provides the information of the updated content view to the display control unit 121, and the display control unit 121 causes the LCD 150 to display the content view screen 540 on the basis of the information (step S503). Here, the information provided from the view information management unit 125 to the display control unit 121 may include information indicating which content information is new arrival information, and the display control unit 121 may display the new arrival icon 542 on the basis of the content information that is the new arrival information. In addition, the feature view 543 displayed on the content view screen 540 may be displayed with respect to an item view 541 including the new arrival information or an item view 541 of a predetermined position (for example, upper left).

Next, the display control unit 121 determines whether or not any item view has been selected by touch of the user on the touch pad 110 (step S505). Here, if any item view 541 is determined to have been selected, the display control unit 121 changes content of the feature view 543 to content corresponding to the selected item view 541 (step S507). Thereafter, the display control unit 121 displays a content view screen including the changed feature view 543 (step S503).

On the other hand, if no item view 541 is determined to have been selected in step S505, the display control unit 121 determines whether or not any content information 544 has been selected by touch of the user on the touch pad 110 (step S509). Here, if any content information 544 is determined to have been selected, the application management unit 126 starts up an application corresponding to the content of the selected content information 544 (step S511) and provides the user with the content.

On the other hand, if no content information 544 is determined to have been selected in step S509, the display control unit 121 determines whether or not the setting icon 545 has been selected by touch of the user with the touch pad 110 (step S513). Here, if the setting icon 545 is determined to have been selected, the display control unit 121 displays an editing screen of a content view, and the view information management unit 125 executes an editing process of the content view (step S515). The editing process of the content view will be described later.

After the editing process of the content view in step S515, the view information management unit 125 updates information of the content view according to settings of the content view changed by the editing process (step S501). On the other hand, if the setting icon 545 is determined not to have been selected in step S513, the display control unit 121 continuously displays the content view screen 540 (step S503).

In FIG. 27, a state in which the editing screen 550 of the content view has been displayed in the information processing apparatus 100 is shown. In the editing screen 550 displayed on the LCD 150, the item view 541 and an item list 551 are included. The editing screen 550 may also be equally displayed in the information processing apparatus 200.

As in the content view screen 540, the item views 541 are displayed. However, because the feature view 543 is not displayed on the editing screen 550, the item views 541 may be displayed in a flat state without the display effect such as pop-up. By selecting an arbitrary item view 541, the user can edit an item set in the item view 541.

The item list 551 is displayed as a list of items capable of being displayed on the item view 541. In the item list 551, all items available to the user may be displayed in the information processing apparatus 100. The items displayed in the item list 551 may be grouped and displayed, for example, by a type of service, an application for provision, or the like. For example, by selecting an arbitrary item from the item list 551 in a state in which any item 541 has been selected, the user may set the item in the item view 541. In addition, by moving an arbitrary item of the item list 551 to an arbitrary position of the item view 541 in the drag operation, the user may set the item in the item view 541.

The fifth embodiment of the present disclosure has been described above. Although an example in which an item view and a feature view are displayed as a content view screen has been described, this embodiment is not limited thereto. For example, content information may be displayed on the item view and the feature view may not be displayed. In addition, although an example in which the item views are arranged and displayed in tile shapes has been described, this embodiment is not limited thereto. For example, the item views may be arranged and displayed in a list form.

(2-6. Sixth Embodiment)

Figure 28:
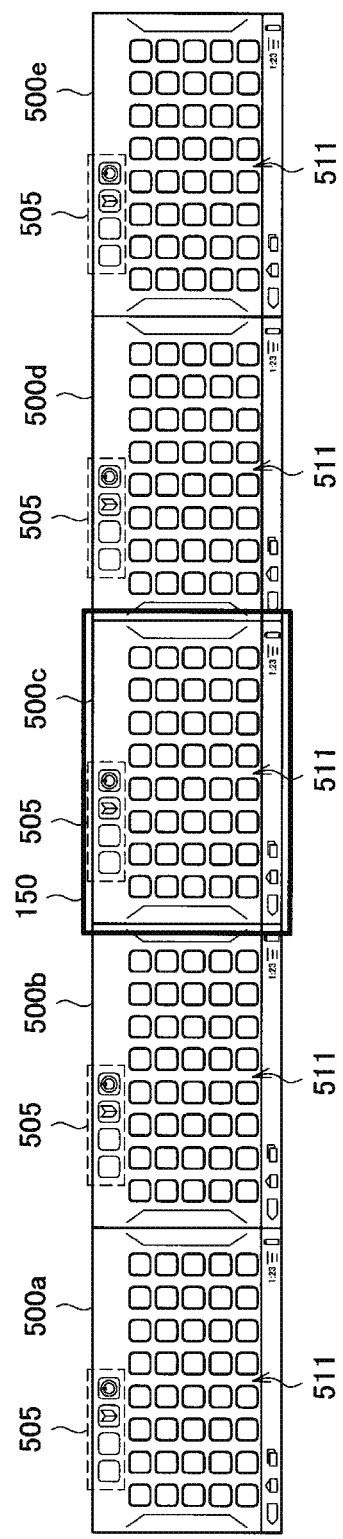
FIG. 28 is a diagram illustrating an overview of a sixth embodiment of the present disclosure.
Figure 29:
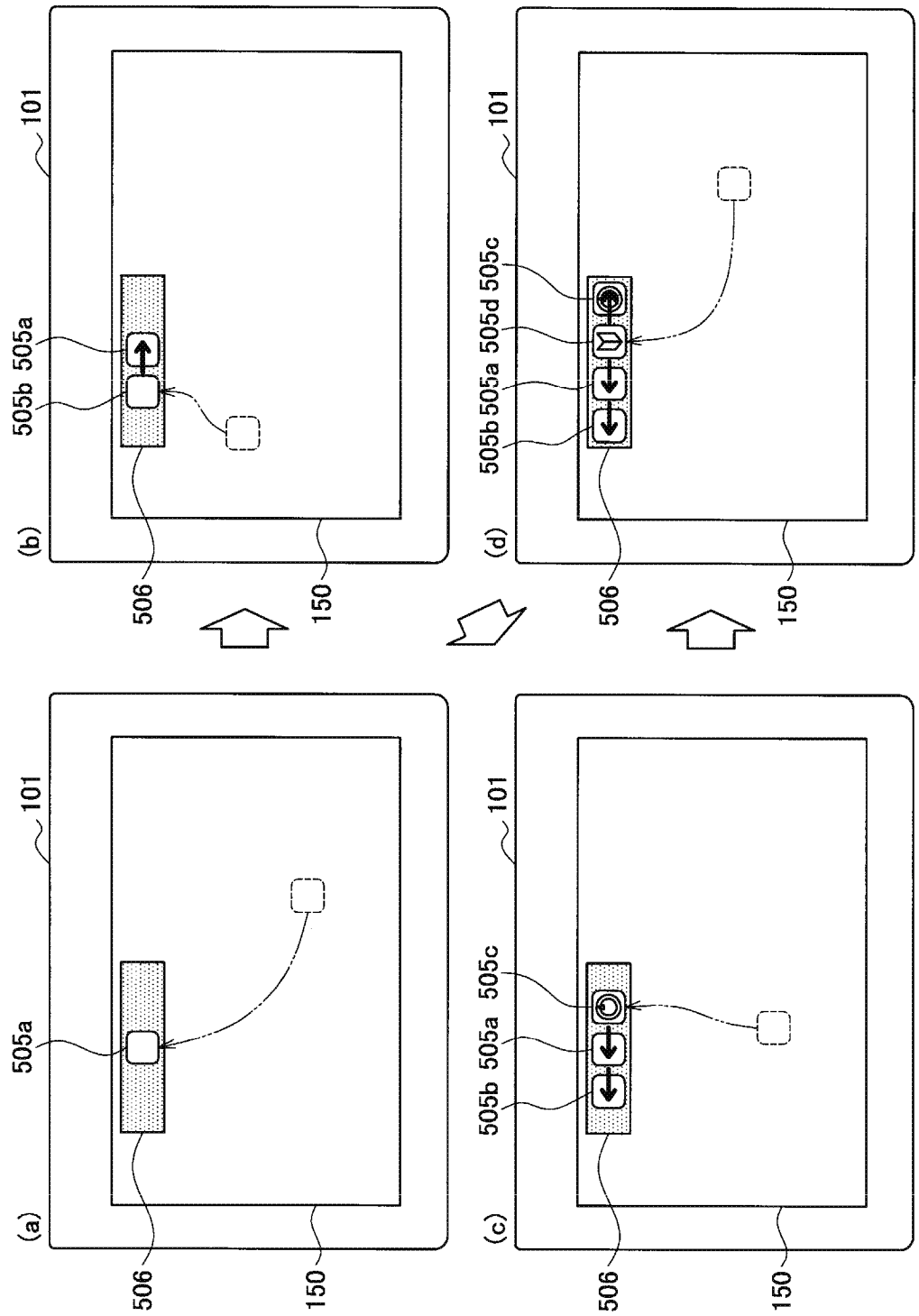
FIG. 29 is a diagram showing a display example of the first information processing apparatus to which the sixth embodiment of the present disclosure has been applied.

Next, the sixth embodiment of the present disclosure will be described with reference to FIGS. 28 and 29. FIG. 28 is a diagram illustrating an overview of this embodiment. FIG. 29 is a diagram showing a display example of the information processing apparatus 100 to which this embodiment has been applied.

In recent years, technology for providing a plurality of work screens called home screens on which an icon for starting up an application or the like is arranged and switching a home screen to be displayed according to a user's desire in an information processing apparatus such as a tablet PC or a smart phone has been developed. When a plurality of home screens are switched and displayed, the operability of a GUI is improved in that a shortcut or widget of a different application can be used according to a scene in which the information processing apparatus is used. However, it may be desirable to commonly display a shortcut of an application to be frequently used or the like, for example, such as a mailer or a web bookmark of a specific page, on each home screen.

In this embodiment, there is provided novel technology for making it easy to access a high use-frequency service when a plurality of home screens are displayed.

For example, in this embodiment, there is provided an information processing apparatus including a display control unit for causing a display unit to display object icons arranged on a plurality of home screens and a common display object icon arranged on a common display area of each home screen, an operation unit for acquiring an operation of moving the object icon to the common display area, and an object management unit for setting the object icon moved to the common display area to the common display object icon, wherein the display control unit automatically uniformly arranges the object icon moved to the common display area in the common display area. The operability of a GUI of the information processing apparatus is further improved.

In the above-described information processing information 100, the display control unit, and the object management unit are implemented by the CPU 120 as the display control unit 121 and the object management unit 124, the operation unit is implemented by the touch pad 110, and the display unit is implemented by the LCD 150.

Among these, the display control unit 121 causes the LCD 150 to sequentially display the plurality of home screens by scrolling or the like. In addition, the display control unit 121 causes the common display area of each home screen to display a common display object icon.

In addition, the object management unit 124 manages information of the common display object icon. The object management unit 124 registers the object icon moved to the common display area displayed on each home screen by the user's operation using the touch pad 110 as the common object icon, and stores its information in the storage unit 130. When each home screen is displayed, the object management unit 124 reads the information of the common display object icon from the storage unit 130, and provides the read information to the display control unit 121. The display control unit 121 arranges and displays the common display object icon on each home screen according to the information provided from the object management unit 124.

In FIG. 28, an example of home screens 500 on which object icons 511 and common object icons 505 are displayed is shown. In the shown example, five home screens 500*a* to 500*e* are set. In the home screens 500, arrangement content of the object icons 511 is different. On the other hand, in the home screens 500, arrangement content of the common display object icons 505 is common. That is, although the home screen 500*c* is displayed on the LCD 150 in the shown example, the common display object icons 505 are displayed in substantially the same position of the LCD 150 even when something to be displayed on the LCD 150 is changed to the home screen 500*a*, the home screen 500*d*, or the like.

In FIG. 29, an example in which the common display object icons 505 are arranged by the drag operation using the touch pad 110 is shown. In (a), one first common display object icon 505*a* is arranged in the common display area 506. In (b), a common display object icon 505*b* is added and a total of two common display object icons 505 are arranged in the common display area 506. In (c), a common display object icon 505*c* is added and a total of three common display object icons 505 are arranged in the common display area 506. In (d), a common display object icon 505*d* is added and a total of four common display object icons 505 are arranged in the common display area 506.

First, in (a), the common display object icon 505*a* is added to the common display area 506. The display control unit 121 causes the common display object icon 505*a* to be displayed at the center of the common display area 506.

Next, in (b), the common display object icon 505*b* is added to a left side of the common display object icon 505*a* of the common display area 506. The display control unit 121 moves the common display object icon 505*a* to a right side according to the addition, so that the common display object icons 505*a* and 505*b* are uniformly arranged in the common display area 506.

Next, in (c), the common display object icon 505*c* is added to the right side of the common display object icon 505*a* of the common display area 506. The display control unit 121 moves the common display object icons 505*a* and 505*b* to the left side according to the addition, so that the common display object icons 505*a* to 505*c* are uniformly arranged in the common display area 506.

Next, in (d), the common display object icon 505*d* is added between the common display object icon 505*a* and the common display object icon 505*c* of the common display area 506. According to the addition, the display control unit 121 moves the common display object icons 505*a* and 505*b* to the left side and further moves the common display object icon 505*c* to the right side, so that the common display object icons 505*a* to 505*d* are uniformly arranged in the common display area 506.

As described above, in this embodiment, for example, when an object icon 511 is moved by the drag operation to the common display area 506 and added to common display object icons 505, the display control unit 121 automatically uniformly arranges the common display object icons 505 in the common display area 506 after addition by adjusting an arrangement of the common display object icons 505 already present in the common display area 506.

Thereby, it is possible to maintain the common display object icons 505 in a state in which they are easily viewable or selectable and thus improve the operability of a GUI of an information processing apparatus including the common display object icons 505.

The sixth embodiment of the present disclosure has been described above. Although the case where this embodiment is applied to the information processing apparatus 100 has been described above, this embodiment may also be equally applied to the information processing apparatus 200. In this case, the touch pads 210*a* and 210*b* are used instead of the touch pad 110 and the LCDs 250*a* and 250*b* are used instead of the LCD 150.

(3. Supplement)

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An apparatus comprising:
an operation unit configured to acquire a drag operation on a display unit;
a movement amount correction unit configured to increase a movement amount of the drag operation; and
a display control unit configured to control the display unit according to the increased movement amount.

(2) The apparatus according to (1), wherein the movement amount correction unit increases the movement amount by multiplying the movement amount by a value greater than 1.

(3) The apparatus according to (2), wherein the display control unit controls the display unit to display information on a plurality of home screens, and the value greater than 1 is equal to a number of the plurality of home screens.

(4) The apparatus according to any of (1) to (3), wherein the movement amount correction unit increases the movement amount by adding a value greater than zero to the movement amount.

(5) The apparatus according to any of (1) to (4), wherein the operation unit receives a command by a user to perform a normal drag operation, the normal drag operation based on the movement amount without any increase.

(6) The apparatus according to (2), wherein the display control unit controls the display unit to display information on a plurality of home screens, and the movement amount correction unit sets the value to a number obtained by adding a correction value c (0<c<1) to a number of the plurality of home screens.

(7) The apparatus according to any of (1) to (5), wherein the display control unit controls the display unit to display information on a plurality of home screens, and the display control unit causes the display unit to display icons indicating the plurality of home screens and a displayed part of the plurality of home screens when scrolling the display in the display unit.

(8) The apparatus according to (2) or (6), wherein the operation unit acquires the value from a user, and the movement amount correction unit increase the movement amount of the drag operation based on the value received by the operation unit.

(9) The apparatus according to any of (1) to (8), wherein the movement amount correction unit switches whether or not to enlarge the movement amount.

(10) The apparatus according to (9), wherein the operation unit acquires a first type of drag operation and a second type of drag operation at an arbitrary position on the display unit, and the movement amount correction unit enlarges a movement amount of the first type of drag operation and does not enlarge a movement amount of the second type of drag operation.

(11) A method comprising:
acquiring a drag operation on a display unit;
increasing a movement amount of the drag operation; and
controlling the display unit according to the increased movement amount.

(12) A non-transitory computer readable medium encoded with a program that, when loaded on a processor, causes the processor to perform a method comprising:
acquiring a drag operation on a display unit;
increasing a movement amount of the drag operation; and
controlling the display unit according to the increased movement amount.

The invention claimed is:

1. An information processing apparatus comprising:
a touch screen configured to detect a drag operation of a user;
a display; and
a processor configured to
control the display to display at least one of a plurality of home screens on which icons for starting up applications are arranged,
determine, from the drag operation, a movement amount for switching among the plurality of home screens so that a scroll amount of the displayed home screen is consistent with the movement amount of the drag operation, and
control a scrolling among the plurality of home screens on the display based on the determined movement amount for switching among the plurality of home screens such that at least a part of each of the two of the home screens is displayed simultaneously,
wherein the processor is configured to cause the display to display simultaneously a first graphical representation indicating the plurality of home screens and a second graphical representation, the second graphical representation indicating a location of a home screen currently being displayed on the display relative to the plurality of home screens; and
wherein the first graphical representation and the second graphical representation are displayed on the display to be smaller than and to be outside the home screen currently being displayed on the display.

2. The information processing apparatus according to claim 1, wherein the first graphical representation and the second graphical representation are displayed on the display such that the second graphical representation is superimposed on the first graphical representation.

3. The information processing apparatus according to claim 1, wherein the first graphical representation and the second graphical representation are displayed on the display to be separated in a vertical direction from the home screen currently being displayed on the display.

4. The information processing apparatus according to claim 1, wherein the processor is further configured to
receive an input made by the user on a location of the touch screen corresponding to a location at which the first graphical representation is displayed on the display;
determine, from the input, which one of the plurality of home screens should be displayed; and
control the display to display the determined one of the plurality of home screens.

5. The information processing apparatus according to claim 4, wherein the first graphical representation comprises a plurality of elements, each of the plurality of elements representing one of the plurality of home screens.

6. A method performed using an information processing apparatus comprising a touch screen configured to detect a drag operation of a user, a display, and a processor, the method comprising:
controlling the display to display at least one of a plurality of home screens on which icons for starting up applications are arranged,
determining, from the drag operation, a movement amount for switching among the plurality of home screens so that a scroll amount of the displayed home screen is consistent with the movement amount of the drag operation, and
controlling a scrolling among the plurality of home screens on the display based on the determined movement amount for switching among the plurality of home screens such that at least a part of each of the two of the home screens is displayed simultaneously,
wherein the display displays simultaneously a first graphical representation indicating the plurality of home screens and a second graphical representation, the second graphical representation indicating a location of a home screen currently being displayed on the display relative to the plurality of home screens; and
wherein the first graphical representation and the second graphical representation are displayed on the display to be smaller than and to be outside the home screen currently being displayed on the display.

7. A non-transitory, computer-readable medium storing instructions that, when executed on an information processing apparatus comprising a touch screen configured to detect a drag operation of a user, a display, and a processor, control the information processing apparatus to perform a method comprising:
controlling the display to display at least one of a plurality of home screens on which icons for starting up applications are arranged,
determining, from the drag operation, a movement amount for switching among the plurality of home screens so that a scroll amount of the displayed home screen is consistent with the movement amount of the drag operation, and
controlling a scrolling among the plurality of home screens on the display based on the determined movement amount for switching among the plurality of home screens such that at least a part of each of the two of the home screens is displayed simultaneously,
wherein the display displays simultaneously a first graphical representation indicating the plurality of home screens and a second graphical representation, the second graphical representation indicating a location of a home screen currently being displayed on the display relative to the plurality of home screens; and
wherein the first graphical representation and the second graphical representation are displayed on the display to be smaller than and to be outside the home screen currently being displayed on the display.

* * * * *